US012790229B2

(12) United States Patent
Zhang et al.

(10) Patent No.: US 12,790,229 B2
(45) Date of Patent: Nov. 10, 2026

(54) METHOD FOR PREPARING HIGH PURITY VANADIUM PENTOXIDE FROM VANADIUM-BEARING SHALE BY ALL-WET PROCESS

(71) Applicant: Wuhan University of Science and Technology, Hubei (CN)

(72) Inventors: Yimin Zhang, Hubei (CN); Qiushi Zheng, Hubei (CN); Tao Liu, Hubei (CN); Nannan Xue, Hubei (CN); Jing Huang, Hubei (CN); Pengcheng Hu, Hubei (CN); Hong Liu, Hubei (CN)

(73) Assignee: Wuhan University of Science and Technology, Hubei (CN)

( * ) Notice: Subject to any disclaimer, the term of this patent is extended or adjusted under 35 U.S.C. 154(b) by 619 days.

(21) Appl. No.: 18/456,514

(22) Filed: Aug. 27, 2023

(65) Prior Publication Data

US 2024/0116773 A1 Apr. 11, 2024

(30) Foreign Application Priority Data

Oct. 8, 2022 (CN) ......................... 202211237136.5

(51) Int. Cl.
*C01G 31/02* (2006.01)
*B01D 11/00* (2006.01)
(Continued)

(52) U.S. Cl.
CPC .......... *C01G 31/02* (2013.01); *B01D 11/0288* (2013.01); *B01D 11/0292* (2013.01);
(Continued)

(58) Field of Classification Search
CPC ...... C01G 31/00; C01G 31/02; C01G 31/003; B01D 61/463; B01D 11/0288; B01D 11/0292
See application file for complete search history.

(56) References Cited

FOREIGN PATENT DOCUMENTS

| | | | | |
|---|---|---|---|---|
| CN | 102628101 | * | 8/2012 | ............. Y02P 10/20 |
| CN | 106282538 | | 1/2018 | |

OTHER PUBLICATIONS

12. Wang, et al. "A zero-liquid-discharge scheme for vanadium extraction process by electrodialysis-based technology." Journal of hazardous materials 300 (2015): 322-328 (Year: 2015).*

(Continued)

*Primary Examiner* — Anthony J Zimmer
*Assistant Examiner* — Eric Scott Sherman
(74) *Attorney, Agent, or Firm* — JCIP GLOBAL INC.

(57) ABSTRACT

The present invention relates to a method for preparing high-purity vanadium pentoxide from vanadium-bearing shale by all-wet process. The technical solution is: the "Gradient continuous leaching system of vanadium-bearing shale" is used to wet activate and compound leach vanadium-bearing shale to obtain vanadium-containing acid leachate. The "pH adjusting device of the vanadium-containing acid leachate" is used to adjust the pH of vanadium-containing acid leaching leachate. The post-treatment solution is subjected to hydroxime countercurrent extraction after oxidation, and the raffinate returns to the water using in the wet activation and electrodialysis after neutralization, and the loaded organic phase is regenerated by countercurrent reduction stripping. The regenerated organic phase directly returns to hydroxime countercurrent extraction. The pH is adjusted for vanadium precipitation with chemical valence conversion, and the mother liquor after vanadium precipitation is incorporated into the vanadium-containing acid leachate, and the vanadium-containing hydroxide is oxidized and roasted to prepare vanadium pentoxide.

10 Claims, 6 Drawing Sheets

(51) Int. Cl.

*B01D 11/02* (2006.01)
*B01D 11/04* (2006.01)
*B01D 61/46* (2006.01)
*C01G 31/00* (2006.01)

(52) U.S. Cl.

CPC ........ *B01D 11/0492* (2013.01); *B01D 61/463* (2022.08); *C01G 31/003* (2013.01); *B01D 2011/002* (2013.01)

(56) References Cited

OTHER PUBLICATIONS

Dongshng He et al., "An environmentally-friendly technology of vanadium extraction from stone coal", Minerals Engineering, vol. 20, Jun. 2007, pp. 1184-1186.
Bing Ju, et al., " Extraction Technology of V205 from Stone Coal ", Chinese Journal of Rare Metals, vol. 31, Issue 5, Oct. 2007, with English translation thereof, pp. 1-18.
Xingbin Li et al., "Recovery of Vanadium from H2SO4-HF Acidic Leaching Solution of Black Shale by Solvent Extraction and Precipitation", Metals, vol. 6, Issue 63, Mar. 2016, pp. 1-13.

* cited by examiner

METHOD FOR PREPARING HIGH PURITY VANADIUM PENTOXIDE FROM VANADIUM-BEARING SHALE BY ALL-WET PROCESS

CROSS-REFERENCE TO RELATED APPLICATION

This application claims the priority benefit of Chinese application serial no. 202211237136.5, filed on Oct. 8, 2022. The entirety of the above-mentioned patent application is hereby incorporated by reference herein and made a part of this specification.

BACKGROUND

Technical Field

The present invention belongs to the technology field of vanadium extraction from shale. It specifically relates to a method for preparing high purity vanadium pentoxide from vanadium-bearing shale by all-wet process.

Description of Related Art

Vanadium-bearing shale (commonly known as stone coal) is a unique strategic vanadium bearing resource in China. With decades of in-depth research and practice by scientific and technological workers, vanadium extraction from shale has become one of the main ways to obtain vanadium resources in China. At present, there are the mature processes of vanadium extraction from shale to prepare vanadium pentoxide include below.

(1) Dongsheng He et al. (Dongsheng He, Qiming Feng, Guofan Zhang, Leming Ou, Yiping Lu. An environmentally-friendly technology of vanadium extraction from stone coal [J]. Minerals Engineering, 20(2007): 1184-1186.) proposed the vanadium extraction process of blank roasting of stone coal—NaOH alkali leaching—purification of leaching solution—solvent extraction vanadium precipitation using ammonium salt—calcination to produce vanadium pentoxide. The roasting process of this technology generates $CO_2$, which inevitably increases the carbon emission load. During the alkaline leaching process, a large number of impurities and ions are simultaneously dissolved, and the leaching solution must be purified before extraction, resulting in a long process. Meanwhile, vanadium precipitation using ammonium salt—calcination will generate ammonia nitrogen wastewater and exhaust gas, which pollutes the environment. The recovery rate of vanadium in this process is also relatively low, only 67.39%.

(2) Bing Ju et al. (Bing Ju, Gong Sheng, Gong Zhuqing. Study on the extraction process of vanadium pentoxide from stone coal [J]. Rare Metals, 2007, 31 (5): 670-677.) proposed a vanadium extraction process by oxidation roasting—acid leaching—extraction—vanadium precipitation using ammonia—calcination to produce vanadium pentoxide. Although the purification process is not required, and its recovery rate of vanadium reaches is over 80%, impurity ions such as iron and aluminum still co-extract during the extraction process, which results in a product purity of only 98%. And the roasting process also generates $CO_2$, which causes a high carbon emission load. The vanadium precipitation using ammonia—calcination can also produce ammonia nitrogen wastewater and exhaust gas, polluting the environment.

(3) Zhang Yimin et al. (Zhang Yimin, Yuan Yizhong, Liu Tao, Huang Jing, Bao Shenxu, Chen Tiejun) proposed "one-step method for preparing high purity vanadium pentoxide from stone coal (CN106282538B)", using a vanadium extraction process of boiling roasting—acid leaching—extraction—vanadium precipitation using urea—calcination to produce vanadium pentoxide. Although this process utilizes the uniform slow-release effect of urea to achieve a vanadium precipitation rate of over 98.5% and the purity of product of 99.0%, the urea reagent consumption and the cost are pretty high, and ammonia nitrogen waste gas is still generated during the calcination process. Meanwhile, the process uses calcium oxide or calcium hydroxide to adjust the pH of the acid leachate before extraction, resulting in a large amount of neutralization residue, which is difficult to treat.

(4) Xingbin Li et al. (Xingbin Li, Chang Wei, Zhigan Deng, Cunxiong Li, Gang Fan, Minting Li, Hui Huang. Recovery of vanadium from $H_2SO_4$—HF acidic leaching solution of black shale by solvent extraction and precipitation [J]. Metals, 2016, 6, 63.) proposed a vanadium extraction process that involves direct acid leaching—extraction—vanadium precipitation using ammonia—calcination to produce vanadium pentoxide. Although this process eliminates the roasting process and reduces the emission of $CO_2$, achieving a vanadium recovery rate of over 81% and a product purity of over 99%, the acid consumption is high, and results in a low pH of the acid leachate. Before extraction, ammonia is used to adjust the pH, which neutralizes a large amount of residual acid causing the residual acid can't be utilized. Meanwhile, there are also problems of vanadium precipitation using ammonia—calcination with ammonia nitrogen wastewater and waste gas in the process.

In conclusion, the existing vanadium extraction from shale process still faces many problems including long process flow, environmental pollution, high dosage of reagents, high energy consumption, low vanadium recovery rate, and low product purity.

SUMMARY

The invention aims to overcome the defects of the prior art, and aims to provide a method for preparing high purity vanadium pentoxide from vanadium-bearing shale by all-wet process with short process flow, environmental friendliness, low dosage of reagents, low energy consumption, high vanadium recovery rate, and high product purity.

To realize the above purpose, the specific steps of the technical scheme adopted by the invention are stated below.

Step 1 Wet Activation and Compound Leaching of the Vanadium-Bearing Shale

Step 1.1 Grading Activation of the Vanadium-Bearing Shale Including Steps Below.

Vanadium-bearing shale is broken to a particle size less than 3 mm with 75~95% to obtain a vanadium-bearing shale powder. Then, the vanadium-bearing shale powder is screened with a 0.45 mm standard screen to obtain a material under the screen and a material on the screen.

Mixing the activator with the material under the screen and the material on the screen respectively according to a mass ratio of (0.04~0.07):1 to obtain a mixed material I and a mixed material II; Then, adding water to the mixed material I and mixed material II according to a liquid-solid ratio of 0.4~0.6 L/kg and performing a slurry process to obtain a mixed slurry I and a mixed slurry II respectively; feeding the mixed slurry I into a mill for wet activation for 1~4 minutes to obtain an activated slurry I; feeding the mixed slurry II into the mill for wet activation for 10~30 minutes to obtain an activated slurry II; finally, the activated slurry I and the activated slurry II are mixed to obtain the mixed activated slurry.

Step 1.2 Compound Leaching of the Vanadium-Bearing Shale Including Steps Below.

The mixed activated slurry is added at a uniform rate from an upper port of a first feeding pipe 2 of a "Gradient continuous leaching system of vanadium-bearing shale", and a flow quantity of the mixed activated slurry added at a uniform rate is adjusted according to a flow time of the mixed activated slurry with 4~8 hours in the "Gradient continuous leaching system of vanadium-bearing shale"; then opening all steam conveying branch pipes 4 in the "Gradient continuous leaching system of vanadium-bearing shale", and adjusting a temperature of a tank 8 of the leaching device 1 to 98~130° C.; then, adding an inorganic acid according to a mass ratio of the vanadium-bearing shale to the inorganic acid of 1:(0.275~0.40), and adding 0.5~1 mol of a coordination agent per kg the vanadium-bearing shale, the inorganic acid is added at a uniform rate from an acid filling pipe 13 of a first leaching device 1, and the coordination agent is added at a uniform rate from the acid filling pipe 13 of a second leaching device 1.

The mixed slurry output from a lower port of the last feeding pipe 2 of the "Gradient continuous leaching system of vanadium-bearing shale" is subjected to the solid-liquid separation to obtain a vanadium-containing acid leachate and a leach residue.

Wherein the inorganic acid is a mixture obtained by a volume ratio of sulfuric acid to other inorganic acids except for the sulfuric acid with 1:(0~1); wherein the other inorganic acids except for the sulfuric acid are more than one of phosphoric acid and hydrochloric acid.

Step 2 Adjustment of pH of the vanadium-containing acid leachate including steps below.

The adjustment of the pH of the vanadium-containing acid leachate is divided into two stages, and a "pH adjusting device of the vanadium-containing acid leachate" is the same for both stages; The "pH adjusting device of the vanadium-containing acid leachate" used in a first stage is called a first adjustment device; The "pH adjusting device of the vanadium-containing acid leachate" used in a second stage is called a second adjustment device.

Connecting $m^{th}$-stage conditioning chamber of the first adjustment device to $1^{st}$-stage conditioning chamber of the second adjustment device; $m^{th}$-stage acid recovery chamber of the second adjustment device is connected to $1^{st}$-stage acid recovery chamber of the first adjustment device.

Wherein the first stage of the adjustment of the pH of the vanadium-containing acid leachate is that a sodium sulfate solution is injected into an anode chamber and a cathode chamber of the first adjustment device, respectively; the vanadium-containing acid leachate is injected into an inlet of $1^{st}$-stage conditioning chamber of the first adjustment device, and water or low acid solution is injected into an inlet of $1^{st}$-stage acid recovery chamber of the first adjustment device.

Turning on a DC power supply of the first adjustment device, wherein the DC power supply is set to constant voltage mode.

The vanadium-containing acid leachate is injected into the inlet of the $1^{st}$-stage conditioning chamber of the first adjustment device, which flows through $2^{nd}$-stage conditioning chamber, $3^{rd}$ stage conditioning chamber, . . . , $m-1^{th}$-stage conditioning chamber, $m^{th}$-stage conditioning chamber, and then flows out of an outlet of the $m^{th}$-stage conditioning chamber to obtain a pre-conditioning solution.

The water is injected into the inlet of the $1^{st}$-stage acid recovery chamber of the first adjustment device, which flows through $2^{nd}$-stage acid recovery chamber, $3^{rd}$-stage acid recovery chamber, . . . , $m-1^{th}$-stage acid recovery chamber, $m^{th}$-stage acid recovery chamber, and then flows out of an outlet of the $m^{th}$-stage acid recovery chamber to obtain a recovered acid solution; Wherein the recovered acid solution is used in preparation of the inorganic acid as described in step 1.2 and a stripping regenerant as described in step 3.3.

Wherein the pH of the pre-conditioning solution is 0.5~1.2.

Wherein the second stage of the adjustment of the pH of the vanadium-containing acid leachate is that the sodium sulfate solution is injected into the anode chamber and the cathode chamber of the second adjustment device, respectively; the pre-conditioning solution of the first adjustment device is injected into the inlet of the $1^{st}$-stage conditioning chamber of the second adjustment device, and water is injected into the inlet of the $1^{st}$-stage acid recovery chamber of the second adjustment device.

Turning on the DC power supply of the second adjustment device, wherein the DC power supply is set to constant current mode.

The pre-conditioning solution is injected into the inlet of the $1^{st}$-stage conditioning chamber of the second adjustment device, which flows through the $2^{nd}$-stage conditioning chamber, the $3^{rd}$-stage conditioning chamber, . . . , the $m-1^{th}$-stage conditioning chamber, the $m^{th}$-stage conditioning chamber, and then flows out of the outlet of the $m^{th}$-stage conditioning chamber to obtain a post-treatment solution.

The water is injected into the inlet of the $1^{st}$-stage acid recovery chamber of the first adjustment device, which flows through the $2^{nd}$-stage acid recovery chamber, the $3^{rd}$-stage acid recovery chamber, . . . , the $m-1^{th}$-stage acid recovery chamber, the $m^{th}$-stage acid recovery chamber, and then flows out of the outlet of the $m^{th}$-stage acid recovery chamber to obtain a low-acid solution; wherein the low-acid solution returns to the $1^{st}$-stage acid recovery chamber of the first adjustment device.

Wherein the pH of the post-treatment solution is 1.5~2.5.

Step 3 Purification and enrichment including steps below.

Step 3.1 According to a molar ratio of oxidant to vanadium ions in the post-treatment solution as (0.3~0.5):1, the oxidant is added into the post-treatment solution, and stirring for 0.5~1 hours to obtain a feed solution.

Step 3.2 An organic phase is produced according to a volume ratio of hydroxime extractant to sulfonated kerosene as 1:(2~9); then, according to a volume ratio of the feed solution to the organic phase as (2~6):1, a loaded organic phase and a raffinate are obtained by countercurrent extraction in 2~5 stages at an extraction temperature of 25~60° C. and a single stage extraction time of 8~20 minutes; after neutralization, the raffinate returns to the slurry process in step 1.2 and/or to the water using in the acid recovery chamber in step 2.

Step 3.3 According to a molar ratio of reductant and vanadium in the loaded organic phase as (1-5):1, the reductant is dissolved into the recovered acid solution as described in step 2 to obtain a stripping regenerant.

Wherein the reductant is one or more than one of oxalic acid, potassium oxalate, sodium oxalate, ammonium oxalate.

Step 3.4 According to a volume ratio of the loaded organic phase to the stripping regenerant as (3~6):1, a regenerated organic phase and a vanadium-rich solution are obtained by countercurrent extraction in 2~6 stages at an extraction temperature of 60-80° C. and a single stage extraction time of 15~35 minutes; wherein the regenerated organic phase returns directly to step 3.2 as organic phase for recycling.

Step 4 Preparation of the high purity vanadium pentoxide t including steps below.

Step 4.1 According to a molar ratio of vanadium ion in the vanadium-rich solution to an accelerator as 1:(0.01~0.05), the accelerator is added into the vanadium-rich solution, and stirring for 0.5-1.5 hours to obtain a primary solution for vanadium precipitation; then, the pH of the primary solution is adjusted to 0.5-2 to obtain a reaction solution for vanadium precipitation.

Step 4.2 The reaction solution is transferred to a reaction vessel for vanadium precipitation valence conversion at a reaction temperature of 160~220° C. and a reaction time of 4-8 hours, then cooled to room temperature; a solid-liquid separation is carried out to obtain a vanadium-containing hydroxide and mother liquor after vanadium precipitation.

Wherein the mother liquor after vanadium precipitation is incorporated into the vanadium-containing acid leachate of step 1.2.

Step 4.3 The vanadium-containing hydroxide is roasted with chemical valence conversion under an oxygen-rich atmosphere at a roasting temperature of 300-500° C. and a roasting time of 0.5-2 hours to produce the high purity vanadium pentoxide.

Wherein the "Gradient continuous leaching system of vanadium-bearing shale" described in step 1.2 consist of n the leaching devices 1, steam conveying pipes 5, n the steam conveying branch pipes 4 and n+1 the feeding pipes 2.

With the purpose of convenient narration, relevant letters are uniformly described as follows:

- n indicates a number of the leaching devices 1, the steam conveying branch pipes 4 and the feeding pipes 2, n is a natural number from 2 to 10;
- h indicates a height of the tank 8 in the leaching device 1, its unit is mm;
- D indicates a diameter of the tank 8 in the leaching device 1, its unit is mm.

Wherein the leaching devices 1 in the "Gradient continuous leaching system of vanadium-bearing shale" are setting in a ladder pattern with a height difference $\Delta h_1=(\frac{3}{4}\sim\frac{1}{2})$ h.

The upper port of the first feeding pipe 2 is connected to an external feeding bin, and the lower port of the first feeding pipe 2 is connected to the inlet of the first leaching device 1; the upper port of the second feeding pipe 2 is connected to the outlet of the first leaching device 1, and the lower port of the second feeding pipe 2 is connected to the inlet of the second leaching device 1; and so on, an upper port of the $n^{th}$ feeding pipe 2 is connected to an outlet of the $n-1^{th}$ leaching device 1, and a lower port of the $n^{th}$ feeding pipe 2 is connected to an inlet of the $n^{th}$ leaching device 1; an upper port of the $n+1^{th}$ feeding pipe 2 is connected to an outlet of the $n^{th}$ leaching device 1, and a lower port of the $n+1^{th}$ feeding pipe 2 is connected to next working procedure; each feeding pipe 2 is equipped with a gate valve 3 near the upper port.

Each leaching device 1 is equipped with the steam conveying branch pipe 4, an inlet of each steam conveying branch pipe 4 is connected to the steam conveying pipe 5, and an outlet of each steam conveying branch pipe 4 is located above a feed port of feeding pipe 2 in the corresponding leaching device 1; a distance between each steam conveying branch pipe 4 and an inner wall of the corresponding leaching device 1 is $l_b=(\frac{1}{10}\sim\frac{1}{8})$ D.

Wherein all leaching devices 1 consist of the tank 8, a cover plate 9, a drive motor 10, an upper slant lobe paddle 7, a lower straight lobe stirring paddle 6 and an acid filling tank 12.

Wherein the tank 8 is cylindrical, and a height of the tank 8 is h=(4/3~3/2) D; there is an inlet port on one side of the tank 8, a distance of the inlet port from a bottom is $l_j=(\frac{1}{10}\sim\frac{1}{4})$ h; there is an outlet port on the other side of the tank 8, a distance of the outlet port from the bottom is $l_c=(\frac{3}{4}\sim\frac{4}{5})$ h; there is a spherical tab 16 at a bottom center of the tank 8, a bottom diameter of the spherical tab 16 is $d_q=(\frac{2}{5}\sim\frac{2}{3})$ D, a height of spherical tab 16 is $h_q=(\frac{1}{10}+\frac{2}{5})$ D.

An upper part of the tank 8 is fixed with the cover plate 9, wherein a center of cover plate 9 is equipped with the drive motor 10, wherein the drive motor 10 is connected to an upper part of a mixing shaft 14 via coupling, and a lower part of the mixing shaft 14 passing the cover plate 9 extends into the tank 8; a mid of the mixing shaft 14 is equipped with the upper slant lobe paddle 7, and a bottom of the mixing shaft 14 is connected to the lower straight lobe stirring paddle 6 via a hub 15.

Diameters of the upper slant lobe paddle 7 and the lower straight lobe stirring paddle 6 are $d_j=(\frac{1}{3}\sim\frac{2}{3})$ D, a distance between the lower straight lobe stirring paddle 6 and a top of the spherical tab 16 is $l_t=(\frac{1}{20}\sim\frac{1}{8})$ h, and a distance between the upper slant lobe paddle 7 and the lower straight lobe stirring paddle 6 is $l_i=(\frac{1}{5}\sim\frac{1}{3})$ h.

There is a lower acid filling pipe 13 on one side of the cover plate 9, a lower part of the lower acid filling pipe 13 passing the cover plate 9 extends into the tank 8, an upper part of the lower acid filling pipe 13 is connected to an outlet of the acid filling tank 12, an inlet of the acid filling tank 12 is connected to the lower part of the upper acid filling pipe 13, the upper part of the upper acid filling pipe 13 is connected to a relevant acid source; The upper acid filling pipe 13 and the lower acid filling pipe 13 are equipped with a butterfly valve 11 respectively.

Wherein a distance between the acid filling pipe 13 and right inner wall of the tank 8 is $b_2=(\frac{1}{10}\sim\frac{1}{8})$ D.

Wherein the "pH adjusting device of the vanadium-containing acid leachate" described in step 2 is that a cathode is connected to a negative terminal of the DC power supply and an anode is connected to a positive terminal of the DC power supply; the cathode and the anode are placed correspondingly on right side and left side of membrane stack.

Wherein the membrane stack consists of $1^{st}$ cation exchange membrane, $1^{st}$ anion exchange membrane, $2^{nd}$ cation exchange membrane, $2^{nd}$ anion exchange membrane, $3^{rd}$ cation exchange membrane, . . . , $m^{th}$ cation exchange membrane, $m^{th}$ anion exchange membrane and $m+1^{th}$ cation exchange membrane in order from a direction of the anode to the cathode.

Wherein m is a positive integer from 10 to 1000.

From the direction of the anode to the cathode, a gap between the anode and the Pt cation exchange membrane forms the anode chamber, a gap between the Pt cation exchange membrane and the $1^{st}$ anion exchange membrane forms the $1^{st}$-stage conditioning chamber, a gap between the Pt anion exchange membrane and the $2^{nd}$ cation exchange membrane forms the $m^{th}$-stage acid recovery chamber, a gap between the $2^{nd}$ cation exchange membrane and the $2^{nd}$ anion exchange membrane forms the $2^{nd}$-stage conditioning chamber, a gap between the $2^{nd}$ anion exchange membrane and the $3^{rd}$ cation exchange membrane forms the $m-1^{th}$ stage acid recovery chamber, . . . , and so on. A gap between the $m-1^{th}$ stage cation exchange membrane and the $m-1^{th}$ stage anion exchange membrane forms the m−1$^{th}$ stage conditioning chamber, a gap between the m−1$^{th}$ stage anion exchange membrane and the m$^{th}$ stage cation exchange membrane forms the 2$^{nd}$ stage acid recovery chamber, a gap between the m$^{th}$ stage cation exchange membrane and the m$^{th}$ stage anion exchange membrane forms the m$^{th}$-stage conditioning chamber, a gap between the m$^{th}$ stage anion exchange membrane and the m+1$^{th}$ stage cation exchange membrane forms the 1$^{st}$-stage acid recovery chamber, a gap between the m+1$^{th}$ stage cation exchange membrane and the cathode forms the cathode chamber.

Wherein the 1$^{st}$-stage conditioning chamber, the 2$^{nd}$-stage conditioning chamber, the 3$^{rd}$-stage conditioning chamber, . . . , the m−1$^{th}$-stage conditioning chamber, and the m$^{th}$-stage conditioning chamber are connected in sequence. Wherein the 1$^{st}$-stage acid recovery chamber, the 2$^{nd}$-stage acid recovery chamber, the 3$^{rd}$-stage acid recovery chamber, the m−1$^{th}$-stage acid recovery chamber, the m$^{th}$-stage acid recovery chamber are connected in sequence.

Wherein the "pH adjusting device of the vanadium-containing acid leachate" is obtained by forming a series circuit between the anode electrode chamber, the 1$^{st}$-stage conditioning chamber, the m$^{th}$-stage acid recovery chamber, the 2$^{nd}$-stage conditioning chamber, the m−1$^{th}$-stage acid recovery chamber, . . . , the m−1$^{th}$-stage conditioning chamber, the 2$^{nd}$-stage acid recovery chamber, the m$^{th}$-stage conditioning chamber, the 1$^{st}$-stage acid recovery chamber, the cathode electrode chamber and the DC power supply in the operating condition.

Wherein the coordination agent is one or more than one of oxalic acid, acetic acid, citric acid, and tartaric acid.

Wherein the activator is one or more than one of sodium fluoride, calcium fluoride, potassium fluoride, and ammonium fluoride.

Wherein the oxidant is sodium chlorate, or potassium chlorate.

Wherein the hydroxime extractant contains more than one of aldoxime and ketoxime.

Wherein the accelerator is one or more than one of glucose, fructose and lactose.

Wherein the volume fraction of oxygen in the oxygen-rich atmosphere is 30-100%.

Wherein a gasket is equipped between the upper part of the tank 8 and the cover plate 9.

Wherein the material of the leaching device 1 and the feeding pipe 2 is acid-resistant steel.

Wherein the constant voltage mode has an initial current density of 120~300 A/m$^2$; the constant current mode has an initial current density of 120~300 A/m$^2$.

Due to the adoption of the above technical solution, the present invention has the following positive effects compared to the existing technologies.

1. The present invention adopts a "Gradient continuous leaching system of vanadium-bearing shale" in the compound leaching of vanadium-bearing shale. The tank 8 of the system is equipped with a double-layer stirring paddle with an upper slant-lobe and lower straight-lobe and a bottom convex platform with arc-shaped, which forms an efficient dispersion area at the bottom to enhance the axial flow of the liquid phase. It also causes the flow field inside tank 8 to flip up and down to form a circulating flow, which improves the distribution characteristics of the flow field inside the tank 8 and effectively reduces mineral deposition at the bottom. The steam conveying branch pipe is located near the lower six straight-lobe turbine paddle, and due to the tortuosity of the flow field near the lower paddle, the speed fluctuation is large, which can improve the gas dispersion effect and ensure uniform heating of the tank. The "Gradient continuous leaching system of vanadium-bearing shale" efficiently couples mineral distribution and temperature dispersion, which reduces energy consumption by 15~25%.

2. The present invention adopts a method of wet chemical activation—compound acid leaching to leach vanadium-bearing shale. Grading activation improves the activation effect of coarse particles, avoids over-activation of fine particles, reduces the agglomeration phenomenon during the leaching process, improves activation efficiency, and reduces reagent consumption. Through activation, it promotes the bonding and adsorption of fluorine ions with vanadium-containing phase, enhances surface negativity and wettability, reduces the energy barrier of the dissolution reaction of vanadium-containing phase in vanadium-bearing shale, and enhances the dissolution of vanadium. Through the process of first activating and then acid leaching, fluorine ions are pre-combined with silicon aluminum on the mica structure under mechanical force to form chemical adsorption. Hydrofluoric acid is not generated in the subsequent acid leaching process, which avoids environmental issues such as hydrofluoric acid smoke and is environmentally friendly. Through the combination of inorganic acids and coordination agents, the leaching process synergistically and efficiently destroys vanadium-containing phases, promotes the dissolution of vanadium-containing silicate minerals, further reduces acid consumption, and ultimately achieves a vanadium leaching rate of over 90%. This all-wet vanadium extraction technology eliminates the roasting process, shortens the process flow, and achieves source reduction of $CO_2$.

3. The "pH adjusting device of the vanadium-containing acid leachate" adopted by this present invention to adjust the pH of vanadium-containing acid leachate through selective electrodialysis with multi-stage dual mode series, which avoids the problems of high reagent consumption and large slag production in the existing alkali neutralization technology and reducing the concentration of vanadium ions by reverse osmosis of diffusion dialysis water. It is not easy to reach the limit current density using the constant voltage mode in the early stage, while the constant current mode in the later stage can maintain a stable ion mass transfer rate, which can accelerate the separation of hydrogen and vanadium ions in the vanadium-containing acid leachate, without the need for any reagents, solid-liquid separation, and can't generate any neutralization slag or ammonia nitrogen wastewater. The retention rate of vanadium is above 95%, and the recovery rate of acid is above 85%. The concentration of recovered acid is 1.5~2.5 mol/L, which can be directly used for the preparation of inorganic acids in the leaching process and stripping regenerant, without causing vanadium loss.

4. The present invention uses a process of hydroxime extraction and reductive stripping regeneration to separate and enrich vanadium. The double functional groups of oxime group and phenolic hydroxyl group connect with vanadium to form an electroneutral chelate with a stable double-ring structure, which has good selectivity. The extraction process is less affected by pH and has strong adaptability, with a single stage extraction rate of 85~95% for vanadium, and vanadium and impurities are efficiently separated and enriched. The co-extraction rate of iron, aluminum, magnesium, potassium, and phosphorus ions is all less than 3%. By utilizing the synergistic effect of the reducibility of oxalate and the hydrogen ions provided by dilute acid, and the lower coordination ability of tetravalent vanadium with the organic phase than pentavalent vanadium, the pentavalent vanadium in the organic phase is reduced and released into the stripping solution, and the hydrogen ions in the stripping agent replace the vanadium in the extracting agent, which achieves the synchronous regeneration for functional groups of the extracting agent and replaces the regeneration process of the organic phase. This process is simple.

5. The present invention adopts a method of vanadium precipitation with valence conversion—oxidation roasting to prepare high purity vanadium pentoxide. The excess oxalic or oxalate in the vanadium-rich solution is used to reduce $VO_2^+$ to $VO^+$ while providing $OH^-$ to promote the formation of VO(OH). Using sugars as accelerator in vanadium precipitation, their rich oxygen-containing groups can provide a large number of nucleation sites, which promote the rapid nucleation of vanadium oxide ions and improve the yield of vanadium precipitation. In addition, oxalate can form a coordination structure with impurity cations to avoid their coprecipitation. This product has high crystallinity, fewer internal impurity ions, and a vanadium precipitation rate higher than 99%. Since the prepared vanadium containing hydroxide has no impurity peaks, after oxidation roasting, the purity of vanadium pentoxide prepared using this vanadium-containing hydroxide is high, with a purity greater than 99%. The entire process doesn't introduce ammonia nitrogen, nor does it generate ammonia nitrogen wastewater and waste gas, making it environmentally friendly.

6. The present invention achieves 100% recycling and utilization of wastewater generated during the preparation of high purity vanadium pentoxide, such as extraction residue, recovering acid solution, and mother liquor after vanadium precipitation, which achieves zero discharging of wastewater during the preparation process. The present invention is green environmental protection.

Therefore, the present invention has the characteristics of short process flow, environmental friendliness, low dosage of reagents, low energy consumption, high vanadium recovery rate, and high product purity.

DESCRIPTION OF THE EMBODIMENTS

Figure 1:
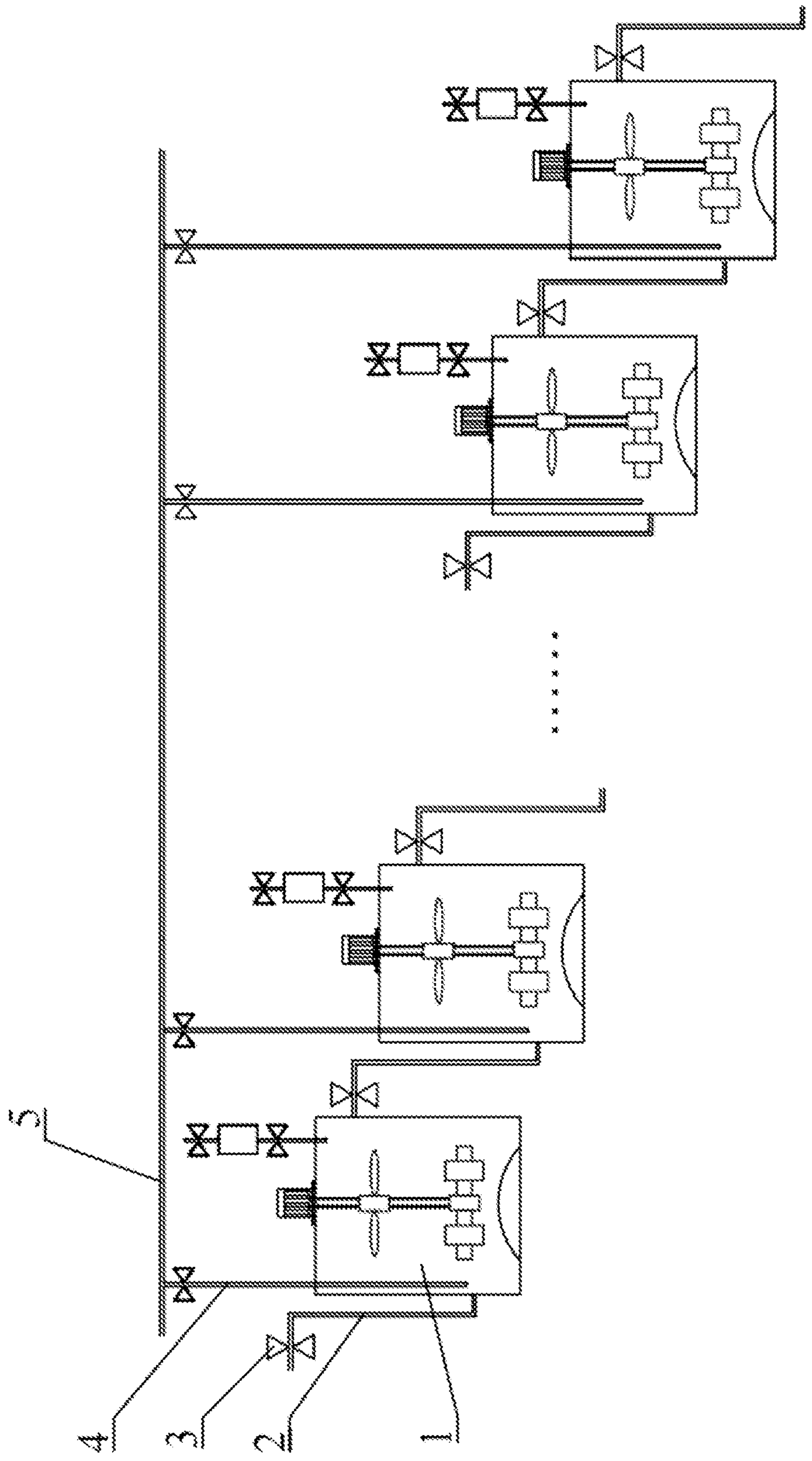
FIG. 1 is a structural schematic diagram of "Gradient continuous leaching system of vanadium-bearing shale" adopted in the invention.

The following is a further description of the invention in combination with the attached drawings and specific embodiments, which is not a limitation of its scope of protection.

A method for preparing high purity vanadium pentoxide from vanadium-bearing shale by all-wet process, and its steps in this mode of carrying out are described below.

Step 1 Wet Activation and Compound Leaching of Vanadium-Bearing Shale

Step 1.1 Grading Activation of Vanadium-Bearing Shale

Vanadium-bearing shale is broken to particle size less than 3 mm with 75~95% to obtain vanadium-bearing shale powder; then the vanadium-bearing shale powder is screened with a 0.45 mm standard screen to obtain the material under the screen and the material on the screen.

Mixing the activator with the material under the screen and the material on the screen respectively according to the mass ratio of (0.04~0.07):1 to obtain the corresponding mixed material I and mixed material II; Then, adding water to the mixed material I and mixed material II according to the liquid-solid ratio of 0.4~0.6 L/kg and performing a slurry process to obtain the corresponding mixed slurry I and mixed slurry II; feeding the mixed slurry I into the mill for wet activation for 1-4 minutes to obtain the activated slurry I; feeding the mixed slurry II into the mill for wet activation for 10~30 minutes to obtain the activated slurry II; finally, the activated slurry I and activated slurry II are mixed to obtain the mixed activated slurry.

Step 1.2 Compound Leaching of Vanadium-Bearing Shale

The mixed activated slurry is added at a uniform rate from the upper port of the first feeding pipe 2 of the "Gradient continuous leaching system of vanadium-bearing shale", and the flow quantity of the mixed activated slurry added at a uniform rate is adjusted according to the flow time of the mixed activated slurry with 4~8 hours in the "Gradient continuous leaching system of vanadium-bearing shale"; then opening all steam conveying branch pipes 4 in the "Gradient continuous leaching system of vanadium-bearing shale", and adjusting the temperature of the tank 8 of the leaching device 1 to 98~130° C.; then, adding inorganic acid according to the mass ratio of vanadium-bearing shale to inorganic acid of 1:(0.275~0.40), and adding 0.5-1 mol of coordination agent per kg vanadium-bearing shale, the inorganic acid is added at a uniform rate from the acid filling pipe 13 of the first leaching device 1, and the coordination agent is added at a uniform rate from the acid filling pipe 13 of the second leaching device 1.

The mixed slurry output from the lower port of the last feeding pipe 2 of the "Gradient continuous leaching system of vanadium-bearing shale" is subjected to the solid-liquid separation to obtain vanadium-containing acid leachate and leach residue.

Wherein the inorganic acid is a mixture obtained by the volume ratio of sulfuric acid to other inorganic acids except for sulfuric acid with 1:(0~1); wherein the other inorganic acids except for sulfuric acid are more than one of phosphoric acid and hydrochloric acid.

Step 2 Adjustment of the pH of the Vanadium-Containing Acid Leachate

The adjustment of the pH of the vanadium-containing acid leachate is divided into two stages, and the "pH adjusting device of the vanadium-containing acid leachate" is the same for both stages; the "pH adjusting device of the vanadium-containing acid leachate" used in the first stage is called the first adjustment device; the "pH adjusting device of the vanadium-containing acid leachate" used in the second stage is called the second adjustment device.

Figure 6:
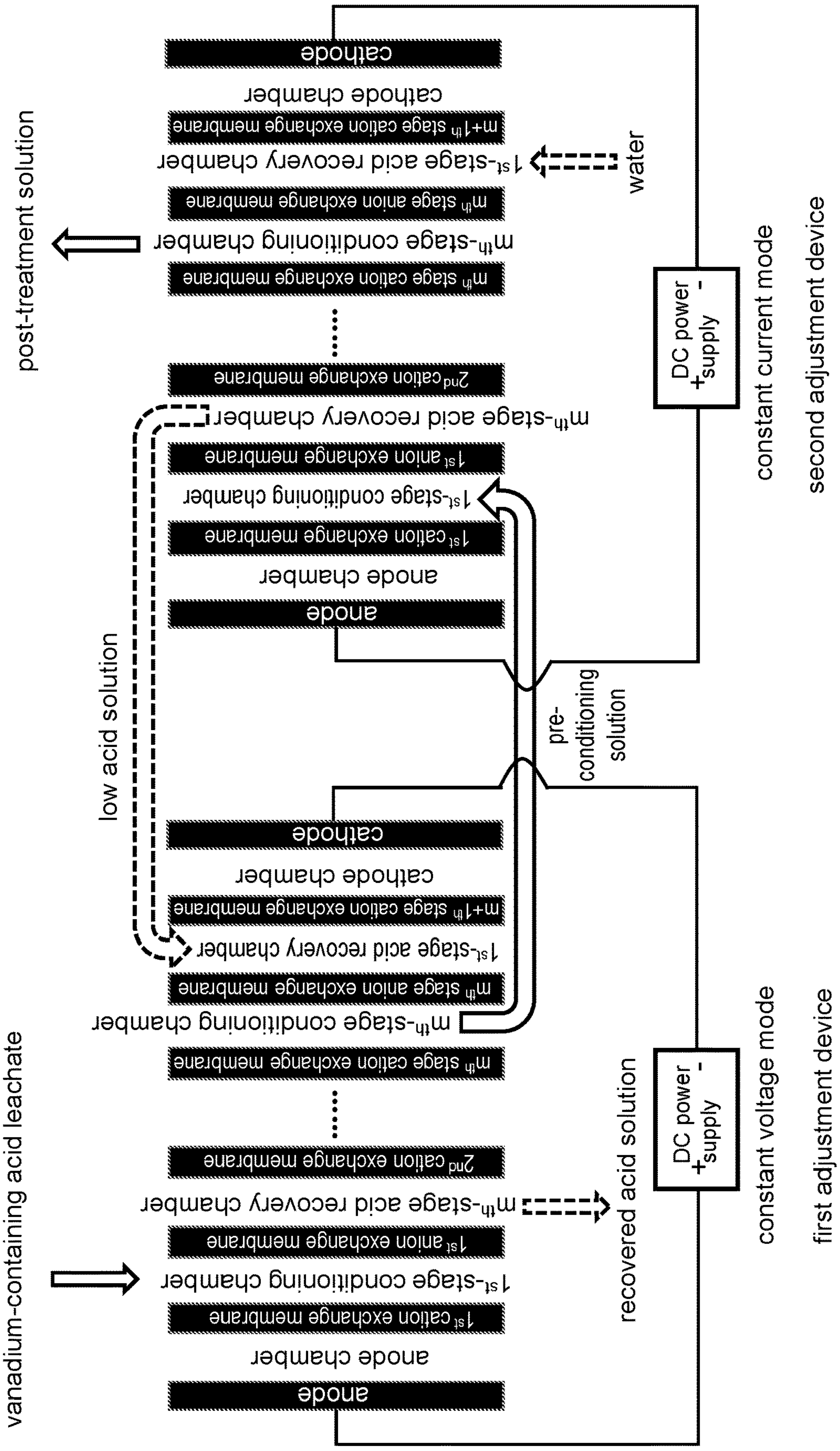
FIG. 6 is a schematic diagram of the method of adjusting pH of vanadium-containing acid leachate by the device shown in FIG. 5.
Figure 7:
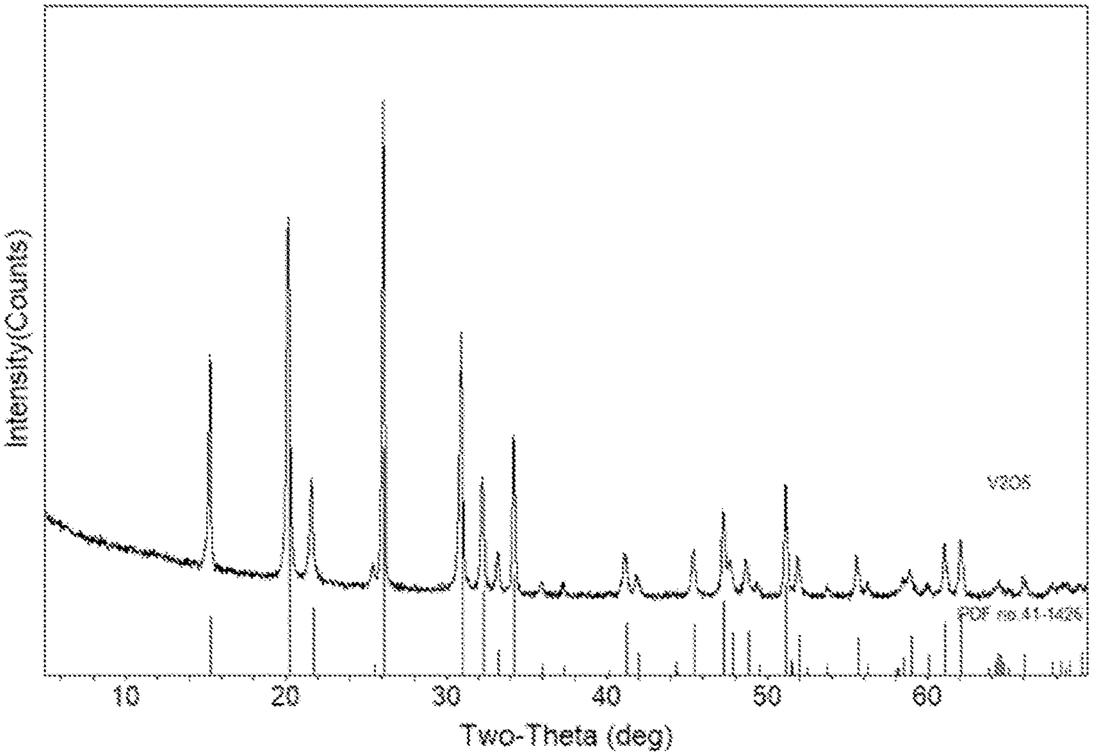
FIG. 7 shows the X-ray diffraction pattern of a high purity vanadium pentoxide prepared by the invention.
Figure 8:
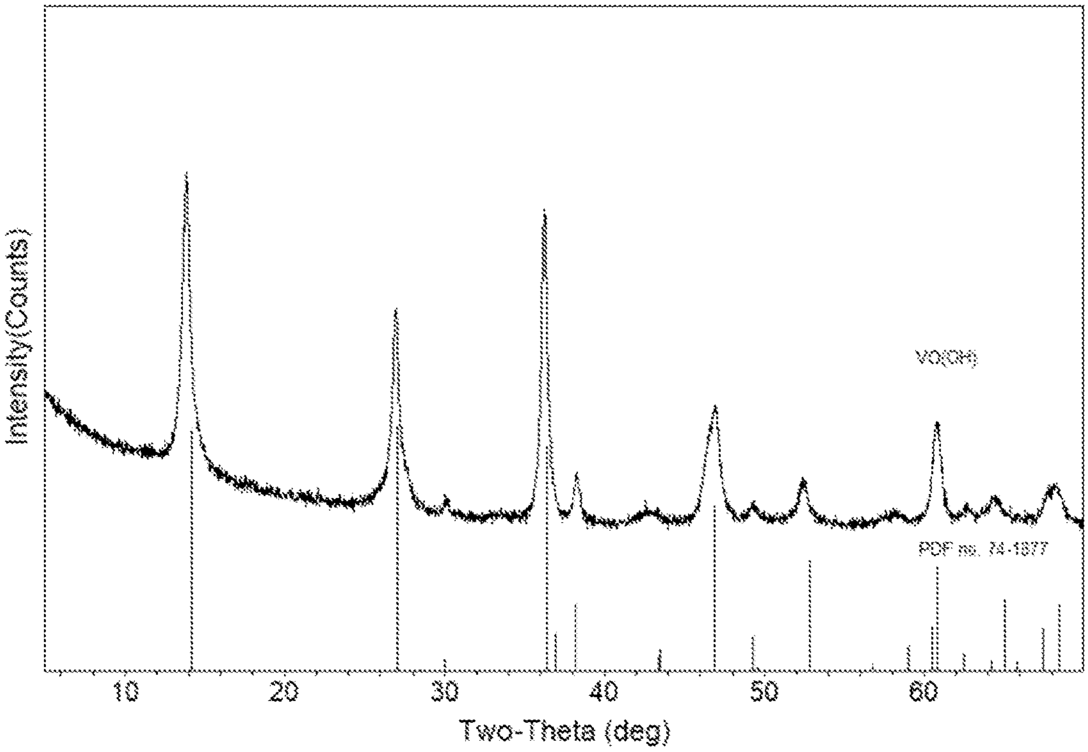
FIG. 8 shows the X-ray diffraction pattern of the preparation of the intermediate vanadium-containing hydroxide of high purity vanadium pentoxide as shown in FIG. 1.

As shown in FIG. 6, connecting the $m^{th}$-stage conditioning chamber of the first adjustment device to the $1^{st}$-stage conditioning chamber of the second adjustment device; the $m^{th}$-stage acid recovery chamber of the second adjustment device is connected to the $1^{st}$-stage acid recovery chamber of the first adjustment device.

As shown in FIG. 6, wherein the first stage of the adjustment of the pH of the vanadium-containing acid leachate is that the sodium sulfate solution is injected into the anode chamber and the cathode chamber of the first adjustment device, respectively; the vanadium-containing acid leachate is injected into the inlet of the $1^{st}$-stage conditioning chamber of the first adjustment device, and water or low acid solution is injected into the inlet of the $1^{st}$-stage acid recovery chamber of the first adjustment device.

Turning on the DC power supply of the first adjustment device, wherein the DC power supply is set to constant voltage mode.

As shown in FIG. 6, the vanadium-containing acid leachate is injected into the inlet of the $1^{st}$-stage conditioning chamber of the first adjustment device, which flows through the $2^{nd}$-stage conditioning chamber, $3^{rd}$ stage conditioning chamber, . . . , $m-1^{th}$-stage conditioning chamber, $m^{th}$-stage conditioning chamber, and then flows out of the outlet of the $m^{th}$-stage conditioning chamber to obtain the pre-conditioning solution.

As shown in FIG. 6, the water is injected into the inlet of the $1^{st}$-stage acid recovery chamber of the first adjustment device, which flows through the $2^{nd}$-stage acid recovery chamber, $3^{rd}$-stage acid recovery chamber, . . . , $m-1^{th}$-stage acid recovery chamber, $m^{th}$-stage acid recovery chamber, and then flows out of the outlet of the $m^{th}$-stage acid recovery chamber to obtain the recovered acid solution; wherein the recovered acid solution is used in the preparation of the inorganic acid as described in step 1.2 and the stripping regenerant as described in step 3.3.

Wherein the pH of the pre-conditioning solution is 0.5~1.2.

As shown in FIG. 6, wherein the second stage of the adjustment of the pH of the vanadium-containing acid leachate is that the sodium sulfate solution is injected into the anode chamber and the cathode chamber of the second adjustment device, respectively; the pre-conditioning solution of the first adjustment device is injected into the inlet of the $1^{st}$-stage conditioning chamber of the second adjustment device, and water is injected into the inlet of the $1^{st}$-stage acid recovery chamber of the second adjustment device.

Turning on the DC power supply of the second adjustment device, wherein the DC power supply is set to constant current mode.

As shown in FIG. 6, the pre-conditioning solution is injected into the inlet of the $1^{st}$-stage conditioning chamber of the second adjustment device, which flows through the $2^{nd}$-stage conditioning chamber, $3^{rd}$-stage conditioning chamber, . . . , $m-1^{th}$-stage conditioning chamber, $m^{th}$-stage conditioning chamber, and then flows out of the outlet of the $m^{th}$-stage conditioning chamber to obtain the post-treatment solution.

As shown in FIG. 6, the water is injected into the inlet of the $1^{st}$-stage acid recovery chamber of the first adjustment device, which flows through the $2^{nd}$-stage acid recovery chamber, $3^{rd}$ stage acid recovery chamber, . . . , $m-1^{th}$-stage acid recovery chamber, $m^{th}$-stage acid recovery chamber, and then flows out of the outlet of the $m^{th}$-stage acid recovery chamber to obtain the low-acid solution; wherein the low-acid solution returns to the $1^{st}$-stage acid recovery chamber of the first adjustment device.

Wherein the pH of the post-treatment solution is 1.5~2.5.

Step 3 Purification and Enrichment

Step 3.1 According to the molar ratio of oxidant to vanadium ions in the post-treatment solution as (0.3~0.5):1, oxidant is added into the post-treatment solution, and stirring for 0.5-1 hours to obtain the feed solution.

Step 3.2 The organic phase is produced according to the volume ratio of hydroxime extractant to sulfonated kerosene as 1:(2~9); then, according to the volume ratio of the feed solution to the organic phase as (2~6):1, the loaded organic phase and raffinate are obtained by countercurrent extraction in 2~5 stages at an extraction temperature of 25~60° C. and a single stage extraction time of 8~20 minutes; after neutralization, the raffinate returns to the slurry process in step 1.2 and/or to the water using in the acid recovery chamber in step 2.

Step 3.3 According to the molar ratio of reductant and vanadium in the loaded organic phase as (1-5):1, the reductant is dissolved into the recovered acid solution as described in step 2 to obtain the stripping regenerant.

Wherein the reductant is one or more than one of oxalic acid, potassium oxalate, sodium oxalate, ammonium oxalate.

Step 3.4 According to the volume ratio of the loaded organic phase to the stripping regenerant as (3~6):1, the regenerated organic phase and vanadium-rich solution are obtained by countercurrent extraction in 2~6 stages at an extraction temperature of 60-80° C. and a single stage extraction time of 15~35 minutes; wherein the regenerated organic phase returns directly to step 3.2 as organic phase for recycling.

Step 4 Preparation of High Purity Vanadium Pentoxide

Step 4.1 According to the molar ratio of vanadium ion in vanadium-rich solution to accelerator as 1:(0.01~0.05), the accelerator is added into the vanadium-rich solution, and stirring for 0.5-1.5 hours to obtain the primary solution for vanadium precipitation; then, the pH of the primary solution is adjusted to 0.5-2 to obtain the reaction solution for vanadium precipitation.

Step 4.2 The reaction solution is transferred to a reaction vessel for vanadium precipitation valence conversion at a reaction temperature of 160~220° C. and a reaction time of 4~8 hours, then cooled to room temperature; the solid-liquid separation is carried out to obtain vanadium-containing hydroxide and mother liquor after vanadium precipitation.

Wherein the mother liquor after vanadium precipitation is incorporated into the vanadium-containing acid leachate of step 1.2.

Step 4.3 The vanadium-containing hydroxide is roasted with chemical valence conversion under an oxygen-rich atmosphere at a roasting temperature of 300-500° C. and a roasting time of 0.5-2 hours to produce the high purity vanadium pentoxide.

Wherein the "Gradient continuous leaching system of vanadium-bearing shale" described in step 1.2 consist of n leaching devices 1, steam conveying pipes 5, n steam conveying branch pipes 4 and n+1 feeding pipes 2.

With the purpose of convenient narration, the relevant letters are uniformly described as follows:

- n indicates the number of leaching devices 1, steam conveying branch pipes 4 and feeding pipes 2, n is a natural number from 2 to 10;
- h indicates the height of the tank 8 in the leaching device 1, its unit is mm;
- D indicates the diameter of the tank 8 in the leaching device 1, its unit is mm.

Wherein the leaching devices 1 in the "Gradient continuous leaching system of vanadium-bearing shale" are setting in a ladder pattern with a height difference $\Delta h_1=(3/4\sim1/2)$ h.

As shown in FIG. 1, the upper port of the first feeding pipe 2 is connected to the external feeding bin, and the lower port of the first feeding pipe 2 is connected to the inlet of the first leaching device 1; The upper port of the second feeding pipe 2 is connected to the outlet of the first leaching device 1, and the lower port of the second feeding pipe 2 is connected to the inlet of the second leaching device 1; and so on, the upper port of the $n^{th}$ feeding pipe 2 is connected to the outlet of the $n-1^{th}$ leaching device 1, and the lower port of the $n^{th}$ feeding pipe 2) is connected to the inlet of the $n^{th}$ leaching device 1; the upper port of the $n+1^{th}$ feeding pipe 2 is connected to the outlet of the $n^{th}$ leaching device 1, and the lower port of the $n+1^{th}$ feeding pipe 2 is connected to the next working procedure; each feeding pipe 2 is equipped with a gate valve 3 near the upper port.

As shown in FIG. 1, each leaching device 1 is equipped with steam conveying branch pipe 4, the inlet of each steam conveying branch pipe 4 is connected to the steam conveying pipe 5, and the outlet of each steam conveying branch pipe 4 is located above the feed port of feeding pipe 2 in the corresponding leaching device 1; the distance between each steam conveying branch pipe 4 and the inner wall of the corresponding leaching device 1 is $l_b=(1/10\sim1/8)$ D.

Wherein all leaching devices 1 consist of tank 8, cover plate 9, drive motor 10, upper slant lobe paddle 7, lower straight lobe stirring paddle 6 and acid filling tank 12.

As shown in FIG. 1, wherein the tank 8 is cylindrical, and the height of the tank 8 is h=(4/3~3/2) D; there is an inlet port on one side of the tank 8, the distance of the inlet from the bottom is $l_j=(1/10\sim1/4)$ h; there is an outlet port on the other side of the tank 8, the distance of the outlet port from the bottom is $l_c=(3/4\sim4/5)$ h; there is a spherical tab 16 at the bottom center of the tank 8, the bottom diameter of the spherical tab 16 is $d_q=(2/5\sim2/3)$ D, the height of spherical tab 16 is $h_q=(1/10\sim2/5)$ D.

As shown in FIG. 1, the upper part of the tank 8 is fixed with a cover plate 9, wherein the center of cover plate 9 is equipped with a drive motor 10, wherein the drive motor 10 is connected to the upper part of the mixing shaft 14 via the coupling, and the lower part of the mixing shaft 14 passing the cover plate 9 extends into the tank 8; the mid of the mixing shaft 14 is equipped with a upper slant lobe paddle 7, and the bottom of the mixing shaft 14 is connected to a six straight-lobe turbine paddle 6 via a hub 15.

As shown in FIG. 1, the diameters of upper slant lobe paddle 7 and the six straight-lobe turbine paddle 6 are $d_j=(1/3\sim2/3)$ D, the distance between the six straight-lobe turbine paddle 6 and the top of the spherical tab 16 is $l_t=(1/20\sim1/8)$ h, and the distance between the upper slant lobe paddle 7 and the six straight-lobe turbine paddle 6 is $l_i=(1/5\sim1/3)$ h.

As shown in FIG. 1, there is a lower acid filling pipe 13 on one side of the cover plate 9, the lower part of the lower acid filling pipe 13 passing the covering 9 extends into the tank 8, the upper part of the lower acid filling pipe 13 is connected to the outlet of the acid filling tank 12, the inlet of the acid filling tank 12 is connected to the lower part of the upper acid filling pipe 13, the upper part of the upper acid filling pipe 13 is connected to the relevant acid source; the upper acid filling pipe 13 and the lower acid filling pipe 13 are equipped with a butterfly valve 11 respectively.

Wherein the distance between the acid filling pipe 13 and the right inner wall of the tank 8 is $b_2=(1/10\sim1/8)$ D.

Wherein a gasket is equipped between the upper part of the tank 8 and the cover plate 9.

Wherein the material of the leaching device 1 and the feeding pipe 2 is acid-resistant steel.

Figure 5:
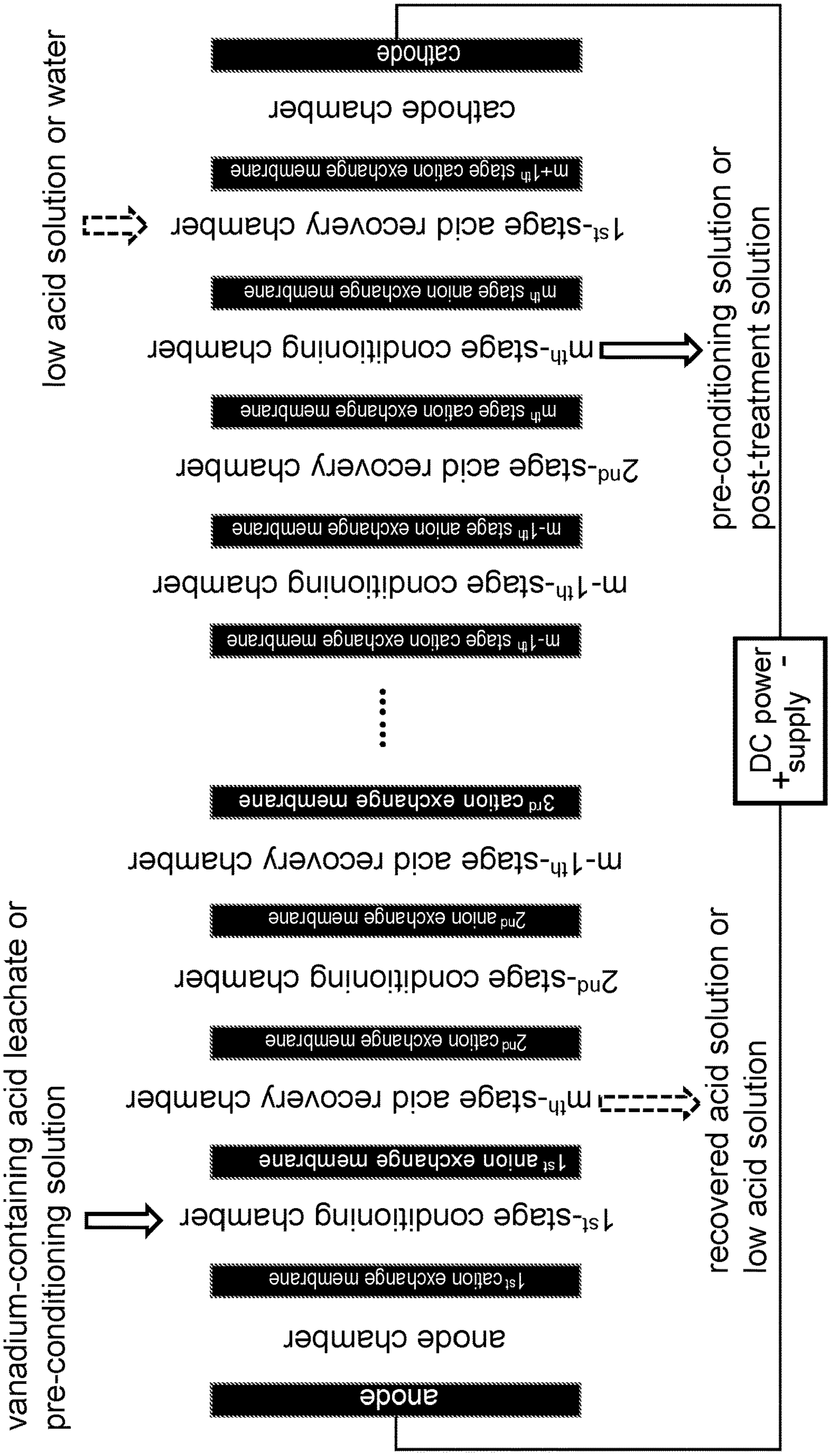
FIG. 5 is a structural schematic diagram of a "pH adjusting device of the vanadium-containing acid leachate" of the invention.

As shown in FIG. 5, wherein the "pH adjusting device of the vanadium-containing acid leachate" described in step 2 is that the cathode is connected to the negative terminal of the DC power supply and the anode is connected to the positive terminal of the DC power supply; the cathode and anode are placed correspondingly on the right and left side of the membrane stack.

As shown in FIG. 5, wherein the membrane stack consists of the Pt cation exchange membrane, the $1^{st}$ anion exchange membrane, the $2^{nd}$ cation exchange membrane, the $2^{nd}$ anion exchange membrane, the $3^{rd}$ cation exchange membrane, . . . , the $m^{th}$ cation exchange membrane, the $m^{th}$ anion exchange membrane and the $m+1^{th}$ cation exchange membrane in order from the direction of the anode to the cathode.

Wherein m is a Positive Integer from 10 to 1000.

As shown in FIG. 5, from the direction of the anode to the cathode, the gap between the anode and the Pt cation exchange membrane forms the anode chamber, the gap between the $1^{st}$ cation exchange membrane and the $1^{st}$ anion exchange membrane forms the $1^{st}$-stage conditioning chamber, the gap between the $1^{st}$ anion exchange membrane and the $2^{nd}$ cation exchange membrane forms the $m^{th}$-stage acid recovery chamber, the gap between the $2^{nd}$ cation exchange membrane and the $2^{nd}$ anion exchange membrane forms the $2^{nd}$-stage conditioning chamber, the gap between the $2^{nd}$ anion exchange membrane and the $3^{rd}$ cation exchange membrane forms the $m-1^{th}$ stage acid recovery chamber, . . . , and so on. The gap between the $m-1^{th}$ stage cation exchange membrane and the $m-1^{th}$ stage anion exchange membrane forms the $m-1^{th}$ stage conditioning chamber, the gap between the $m-1^{th}$ stage anion exchange membrane and the $m^{th}$ stage cation exchange membrane forms the $2^{nd}$ stage acid recovery chamber, the gap between the $m^{th}$ stage cation exchange membrane and the $m^{th}$ stage anion exchange membrane forms the $m^{th}$-stage conditioning chamber, the gap between the $m^{th}$ stage anion exchange membrane and the $m+1^{th}$ stage cation exchange membrane forms the $1^{st}$-stage acid recovery chamber, the gap between the $m+1^{th}$ stage cation exchange membrane and the cathode forms the cathode chamber.

As shown in FIG. 5, wherein the $1^{st}$-stage conditioning chamber, $2^{nd}$-stage conditioning chamber, $3^{rd}$-stage conditioning chamber, . . . , $m-1^{th}$-stage conditioning chamber, and $m^{th}$-stage conditioning chamber are connected in sequence. Wherein the $1^{st}$-stage acid recovery chamber, $2^{nd}$-stage acid recovery chamber, $3^{rd}$-stage acid recovery chamber, . . . , $m-1^{th}$-stage acid recovery chamber, $m^{th}$-stage acid recovery chamber are connected in sequence.

As shown in FIG. 5, wherein the "pH adjusting device of the vanadium-containing acid leachate" is obtained by forming a series circuit between the anode electrode chamber, $1^{st}$-stage conditioning chamber, $m^{th}$-stage acid recovery chamber, $2^{nd}$-stage conditioning chamber, $m-1^{th}$-stage acid recovery chamber, . . . , $m-1^{th}$-stage conditioning chamber, $2^{nd}$-stage acid recovery chamber, $m^{th}$-stage conditioning chamber, $1^{st}$-stage acid recovery chamber, the cathode electrode chamber and the DC power supply in the operating condition.

In this mode of carrying out:

wherein the coordination agent is one or more than one of oxalic acid, acetic acid, citric acid, and tartaric acid;

wherein the activator is one or more than one of sodium fluoride, calcium fluoride, potassium fluoride, and ammonium fluoride;

wherein the oxidant is sodium chlorate, or potassium chlorate;

wherein the hydroxime extractant contains more than one of aldoxime and ketoxime;

wherein the accelerator is one or more than one of glucose, fructose and lactose;

wherein the volume fraction of oxygen in the oxygen-rich atmosphere is 30-100%;

wherein the constant voltage mode has an initial current density of 120~300 $A/m^2$; the constant current mode has an initial current density of 120~300 $A/m^2$.

Example 1

A method for preparing high purity vanadium pentoxide from vanadium-bearing shale by all-wet process, its steps in this example are described below.

Step 1 Wet Activation and Compound Leaching of Vanadium-Bearing Shale

Step 1.1 Grading Activation of Vanadium-Bearing Shale

Vanadium-bearing shale is broken to particle size less than 3 mm with 95% to obtain vanadium-bearing shale powder; then the vanadium-bearing shale powder is screened with a 0.45 mm standard screen to obtain the material under the screen and the material on the screen.

Mixing the activator with the material under the screen and the material on the screen respectively according to the mass ratio of 0.04:1 to obtain the corresponding mixed material I and mixed material II; then, adding water to the mixed material I and mixed material II according to the liquid-solid ratio of 0.4 L/kg and performing a slurry process to obtain the corresponding mixed slurry I and mixed slurry II; feeding the mixed slurry I into the mill for wet activation for 1 minutes to obtain the activated slurry I; feeding the mixed slurry II into the mill for wet activation for 10 minutes to obtain the activated slurry II; finally, the activated slurry I and activated slurry II are mixed to obtain the mixed activated slurry.

Step 1.2 Compound Leaching of Vanadium-Bearing Shale

Figure 2:
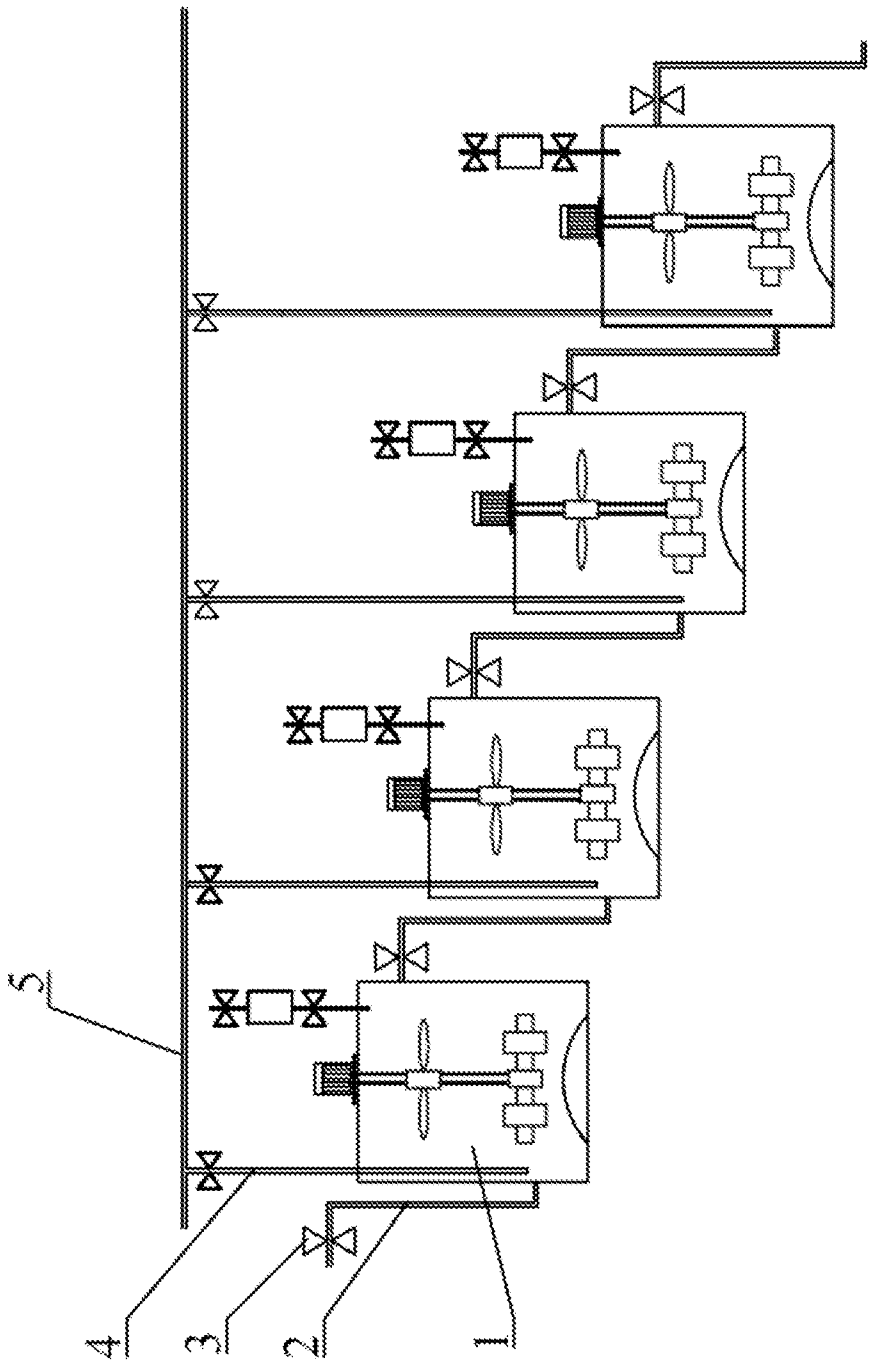
FIG. 2 is another structural schematic diagram of the "Gradient continuous leaching system of vanadium-bearing shale" adopted in the invention.

The "Gradient continuous leaching system of vanadium-bearing shale" adopted in this embodiment is shown in FIG. 2, which is formed by 4 leaching devices 1 in series. The mixed activated slurry is added at a uniform rate from the upper port of the first feeding pipe 2 of the "Gradient continuous leaching system of vanadium-bearing shale", and the flow quantity of the mixed activated slurry added at a uniform rate is adjusted according to the flow time of the mixed activated slurry with 6 hours in the "Gradient continuous leaching system of vanadium-bearing shale"; then opening all steam conveying branch pipes 4 in the "Gradient continuous leaching system of vanadium-bearing shale", and adjusting the temperature of the tank 8 of the leaching device 1 to 98° C.; then, adding inorganic acid according to the mass ratio of vanadium-bearing shale to inorganic acid of 1:0.3, and adding 0.5 mol of coordination agent per kg vanadium-bearing shale, the inorganic acid is added at a uniform rate from the acid filling pipe 13 of the first leaching device 1, and the coordination agent is added at a uniform rate from the acid filling pipe 13 of the second leaching device 1.

The mixed slurry output from the lower port of the last feeding pipe 2 of the "Gradient continuous leaching system of vanadium-bearing shale" is subjected to the solid-liquid separation to obtain vanadium-containing acid leachate and leach residue.

Wherein the inorganic acid is sulfuric acid.

Step 2 Adjustment of the pH of the Vanadium-Containing Acid Leachate

The adjustment of the pH of the vanadium-containing acid leachate is divided into two stages, both of which adopt the "pH adjusting device of the vanadium-containing acid leachate" as shown in FIG. 5. In this device, m=10, that is, the device consists of a $10^{th}$-stage conditioning chamber and a $10^{th}$-stage acid recovery chamber. The "pH adjusting device of the vanadium-containing acid leachate" used in the first stage is called the first adjustment device; the "pH adjusting device of the vanadium-containing acid leachate" used in the second stage is called the second adjustment device.

As shown in FIG. 6, connecting the $10^{th}$-stage conditioning chamber of the first adjustment device to the $1^{st}$-stage conditioning chamber of the second adjustment device, and the $10^{th}$-stage acid recovery chamber of the second adjustment device is connected to the $1^{st}$-stage acid recovery chamber of the first adjustment device.

As shown in FIG. 6, wherein the first stage of the adjustment of the pH of the vanadium-containing acid leachate is that the sodium sulfate solution is injected into the anode chamber and the cathode chamber of the first adjustment device, respectively; the vanadium-containing acid leachate is injected into the inlet of the $1^{st}$-stage conditioning chamber of the first adjustment device, and water or low acid solution is injected into the inlet of the $1^{st}$-stage acid recovery chamber of the first adjustment device.

Turning on the DC power supply of the first adjustment device, wherein the DC power supply is set to constant voltage mode.

As shown in FIG. 6, the vanadium-containing acid leachate is injected into the inlet of the $1^{st}$-stage conditioning chamber of the first adjustment device, which flows through the $2^{nd}$-stage conditioning chamber, $3^{rd}$-stage conditioning chamber, . . . , $9^{th}$-stage conditioning chamber, $10^{th}$-stage conditioning chamber, and then flows out of the outlet of the $10^{th}$-stage conditioning chamber to obtain the pre-conditioning solution.

As shown in FIG. 6, the water is injected into the inlet of the $1^{st}$-stage acid recovery chamber of the first adjustment device, which flows through the $2^{nd}$-stage acid recovery chamber, $3^{rd}$ stage acid recovery chamber, . . . , $9^{th}$-stage acid recovery chamber, $10^{th}$-stage acid recovery chamber, and then flows out of the outlet of the $10^{th}$-stage acid recovery chamber to obtain the recovered acid solution; wherein the recovered acid solution is used in the preparation of the inorganic acid as described in step 1.2 and the stripping regenerant as described in step 3.3.

Wherein the pH of the pre-conditioning solution is 0.9.

As shown in FIG. 6, wherein the second stage of the adjustment of the pH of the vanadium-containing acid leachate is that the sodium sulfate solution is injected into the anode chamber and the cathode chamber of the second adjustment device, respectively; the pre-conditioning solution of the first adjustment device is injected into the inlet of the $1^{st}$-stage conditioning chamber of the second adjustment device, and water is injected into the inlet of the $1^{st}$-stage acid recovery chamber of the second adjustment device.

Turning on the DC power supply of the second adjustment device, wherein the DC power supply is set to constant current mode.

As shown in FIG. 6, the pre-conditioning solution is injected into the inlet of the $1^{st}$-stage conditioning chamber of the second adjustment device, which flows through the $2^{nd}$-stage conditioning chamber, $3^{rd}$-stage conditioning chamber, . . . , $9^{th}$-stage conditioning chamber, $10^{th}$-stage conditioning chamber, and then flows out of the outlet of the $10^{th}$-stage conditioning chamber to obtain the post-treatment solution.

As shown in FIG. 6, the water is injected into the inlet of the $1^{st}$-stage acid recovery chamber of the first adjustment device, which flows through the $2^{nd}$-stage acid recovery chamber, $3^{rd}$-stage acid recovery chamber, . . . , $9^{th}$-stage acid recovery chamber, $10^{th}$-stage acid recovery chamber, and then flows out of the outlet of the $10^{th}$-stage acid recovery chamber to obtain the low-acid solution; wherein the low-acid solution returns to the $1^{st}$-stage acid recovery chamber of the first adjustment device.

Wherein the pH of the post-treatment solution is 1.5.

Step 3 Purification and Enrichment

Step 3.1 According to the molar ratio of oxidant to vanadium ions in the post-treatment solution as 0.3:1, oxidant is added into the post-treatment solution, and stirring for 1 hours to obtain the feed solution.

Step 3.2 The organic phase is produced according to the volume ratio of hydroxime extractant to sulfonated kerosene as 1:9; then, according to the volume ratio of the feed solution to the organic phase as 3:1, the loaded organic phase and raffinate are obtained by countercurrent extraction in 3 stages at an extraction temperature of 25° C. and a single stage extraction time of 16 minutes; after neutralization, the raffinate returns to the slurry process in step 1.2 and/or to the water using in the acid recovery chamber in step 2.

Step 3.3 According to the molar ratio of reductant and vanadium in the loaded organic phase as 2:1, the reductant is dissolved into the recovered acid solution as described in step 2 to obtain the stripping regenerant.

Wherein the reductant is a mixture of oxalic acid and sodium oxalate with a mass ratio of 1:1.

Step 3.4 According to the volume ratio of the loaded organic phase to the stripping regenerant as 5:1, the regenerated organic phase and vanadium-rich solution are obtained by countercurrent extraction in 4 stages at an extraction temperature of 70° C. and a single stage extraction time of 20 minutes; wherein the regenerated organic phase returns directly to step 3.2 as organic phase for recycling.

Step 4 Preparation of High Purity Vanadium Pentoxide

Step 4.1 According to the molar ratio of vanadium ion in vanadium-rich solution to accelerator as 1:0.01, the accelerator is added into the vanadium-rich solution, and stirring for 0.5 hours to obtain the primary solution for vanadium precipitation; then, the pH of the primary solution is adjusted to 0.5 to obtain the reaction solution for vanadium precipitation.

Step 4.2 The reaction solution is transferred to a reaction vessel for vanadium precipitation valence conversion at a reaction temperature of 220° C. and a reaction time of 8 hours, then cooled to room temperature; the solid-liquid separation is carried out to obtain vanadium-containing hydroxide and mother liquor after vanadium precipitation.

Wherein the mother liquor after vanadium precipitation is incorporated into the vanadium-containing acid leachate of step 1.2.

Step 4.3 The vanadium-containing hydroxide is roasted with chemical valence conversion under an oxygen-rich atmosphere at a roasting temperature of 300° C. and a roasting time of 0.5 hours to produce the high purity vanadium pentoxide.

The "Gradient continuous leaching system of vanadium-bearing shale" mentioned in Step 1.2 is the same as the mode of carrying out except for the following technical parameters.

The "Gradient continuous leaching system of vanadium-bearing shale" described in this example is shown in FIG. 2, where n is 4, that is, the system consist of 4 leaching devices 1, 1 steam conveying pipes 5, 4 steam conveying branch pipes 4 and 5 feeding pipes 2.

Wherein the height difference between adjacent leaching devices 1 is $\Delta h_1$=¾ h.

The distance between each steam conveying branch pipe 4 and the inner wall of the corresponding leaching device 1 is $l_b$=1/10 D.

Wherein the height of the tank 8 is h=4/3 D;

the distance of the inlet from the bottom is $l_j$=1/10 h;

the distance of the outlet port from the bottom is $l_c$=¾ h;

the bottom diameter of the spherical tab 16 is $d_q$=⅖ D, the height of spherical tab 16 is $h_q$=1/10 D.

wherein the diameters of upper slant lobe paddle 7 and the six straight-lobe turbine paddle 6 are $d_j$=⅓ D, the distance between the six straight-lobe turbine paddle 6 and the top of the spherical tab 16 is $l_t$=1/20 h, and the distance between the upper slant lobe paddle 7 and the six straight-lobe turbine paddle 6 is $l_i$=⅕ h.

Wherein the distance between the acid filling pipe 13 and the right inner wall of the tank 8 is $b_2$=1/10 D.

In this example:

the "pH adjusting device of the vanadium-containing acid leachate" mentioned above is the same as the mode of carrying out except that m is 10;

wherein the coordination agent is citric acid;

wherein the activator is a mixture of calcium fluoride and potassium fluoride with a mass ratio of 1:1;

wherein the oxidant is sodium chlorate;

wherein the hydroxime extractant is a mixture of aldoxime and ketoxime with a volume ratio of 1:1;

wherein the accelerator is glucose;

wherein the volume fraction of oxygen in the oxygen-rich atmosphere is 30%;

wherein the constant voltage mode has an initial current density of 120 A/$m^2$; the constant current mode has an initial current density of 120 A/$m^2$;

the purity of high purity vanadium pentoxide prepared in this example is 99.21%.

Example 2

A method for preparing high purity vanadium pentoxide from vanadium-bearing shale by all-wet process, its steps of this example are the same as Example 1 except for the following technical parameters.

Step 1 Wet Activation and Compound Leaching of Vanadium-Bearing Shale

Step 1.1 Grading Activation of Vanadium-Bearing Shale

Vanadium-bearing shale is broken to particle size less than 3 mm with 88% to obtain vanadium-bearing shale powder.

Mixing the activator with the material under the screen and the material on the screen respectively according to the mass ratio of 0.05:1 to obtain the corresponding mixed material I and mixed material II; then, adding water to the mixed material I and mixed material II according to the liquid-solid ratio of 0.5 L/kg and performing a slurry process to obtain the corresponding mixed slurry I and mixed slurry II; feeding the mixed slurry I into the mill for wet activation for 4 minutes to obtain the activated slurry I; feeding the mixed slurry II into the mill for wet activation for 16 minutes to obtain the activated slurry II; finally, the activated slurry I and activated slurry II are mixed to obtain the mixed activated slurry.

Step 1.2 Compound Leaching of Vanadium-Bearing Shale

Figure 3:
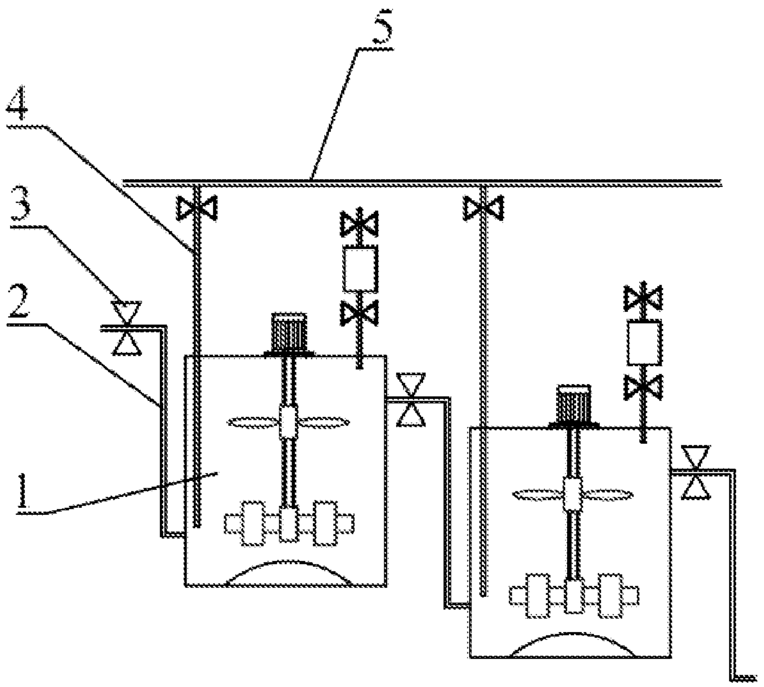
FIG. 3 is yet another structural schematic diagram of "Gradient continuous leaching system of vanadium-bearing shale" adopted in the invention.
Figure 4:
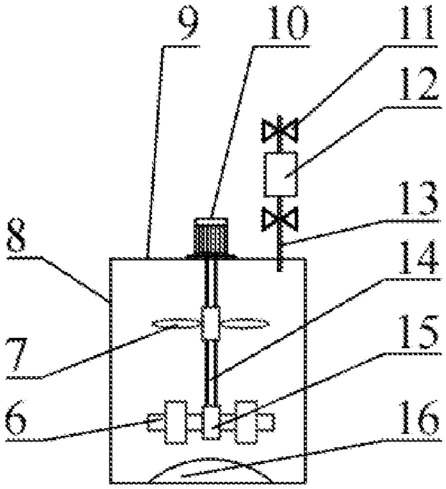
FIG. 4 is the enlarged diagram of leaching device 1 in FIG. 1 to FIG. 3.

The "Gradient continuous leaching system of vanadium-bearing shale" adopted in this embodiment is shown in FIG. 3, which is formed by 2 leaching devices 1 in series.

The specific process is that the flow quantity of the mixed activated slurry added at a uniform rate is adjusted according to the flow time of the mixed activated slurry with 5 hours in the "Gradient continuous leaching system of vanadium-bearing shale"; then opening all steam conveying branch pipes 4 in the "Gradient continuous leaching system of vanadium-bearing shale", and adjusting the temperature of the tank 8 of the leaching device 1 to 110° C.; then, adding inorganic acid according to the mass ratio of vanadium-bearing shale to inorganic acid of 1:0.35, and adding 0.7 mol of coordination agent per kg vanadium-bearing shale, the inorganic acid is added at a uniform rate from the acid filling pipe 13 of the first leaching device 1, and the coordination agent is added at a uniform rate from the acid filling pipe 13 of the second leaching device 1.

The mixed slurry output from the lower port of the last feeding pipe 2 of the "Gradient continuous leaching system of vanadium-bearing shale" is subjected to the solid-liquid separation to obtain vanadium-containing acid leachate and leach residue.

Wherein the inorganic acid is a mixture of sulfuric acid, phosphoric acid, and hydrochloric acid with a mass ratio of 1:0.2:0.1.

Step 2 Adjustment of the pH of the Vanadium-Containing Acid Leachate

The adjustment of the pH of the vanadium-containing acid leachate is divided into two stages, both of which adopt the "pH adjusting device of the vanadium-containing acid leachate" as shown in FIG. 5. In this device, m=100, that is, the device consists of a $100^{th}$-stage conditioning chamber and a $100^{th}$-stage acid recovery chamber. The "pH adjusting device of the vanadium-containing acid leachate" used in the first stage is called the first adjustment device; the "pH adjusting device of the vanadium-containing acid leachate" used in the second stage is called the second adjustment device.

As shown in FIG. 6, connecting the $100^{th}$-stage conditioning chamber of the first adjustment device to the $1^{st}$-stage conditioning chamber of the second adjustment device, and the $100^{th}$-stage acid recovery chamber of the second adjustment device is connected to the $1^{st}$-stage acid recovery chamber of the first adjustment device.

As shown in FIG. 6, wherein the first stage of the adjustment of the pH of the vanadium-containing acid leachate is that the sodium sulfate solution is injected into the anode chamber and the cathode chamber of the first adjustment device, respectively; The vanadium-containing acid leachate is injected into the inlet of the $1^{st}$-stage conditioning chamber of the first adjustment device, and water or low acid solution is injected into the inlet of the $1^{st}$-stage acid recovery chamber of the first adjustment device.

Turning on the DC power supply of the first adjustment device, wherein the DC power supply is set to constant voltage mode.

As shown in FIG. 6, the vanadium-containing acid leachate is injected into the inlet of the $1^{st}$-stage conditioning chamber of the first adjustment device, which flows through the $2^{nd}$-stage conditioning chamber, $3^{rd}$-stage conditioning chamber, . . . , $99^{th}$-stage conditioning chamber, $100^{th}$-stage conditioning chamber, and then flows out of the outlet of the $100^{th}$-stage conditioning chamber to obtain the pre-conditioning solution.

As shown in FIG. 6, the water is injected into the inlet of the $1^{st}$-stage acid recovery chamber of the first adjustment device, which flows through the $2^{nd}$-stage acid recovery chamber, $3^{rd}$ stage acid recovery chamber, . . . , $99^{th}$-stage acid recovery chamber, $100^{th}$-stage acid recovery chamber, and then flows out of the outlet of the $100^{th}$-stage acid recovery chamber to obtain the recovered acid solution; Wherein the recovered acid solution is used in the preparation of the inorganic acid as described in step 1.2 and the stripping regenerant as described in step 3.3.

Wherein the pH of the pre-conditioning solution is 0.5.

As shown in FIG. 6, wherein the second stage of the adjustment of the pH of the vanadium-containing acid leachate is that the sodium sulfate solution is injected into the anode chamber and the cathode chamber of the second adjustment device, respectively; the pre-conditioning solution of the first adjustment device is injected into the inlet of the $1^{st}$-stage conditioning chamber of the second adjustment device, and water is injected into the inlet of the $1^{st}$-stage acid recovery chamber of the second adjustment device.

Turning on the DC power supply of the second adjustment device, wherein the DC power supply is set to constant current mode.

As shown in FIG. 6, the pre-conditioning solution is injected into the inlet of the $1^{st}$-stage conditioning chamber of the second adjustment device, which flows through the $2^{nd}$-stage conditioning chamber, $3^{rd}$-stage conditioning chamber, . . . , $99^{th}$-stage conditioning chamber, $100^{th}$-stage conditioning chamber, and then flows out of the outlet of the $100^{th}$-stage conditioning chamber to obtain the post-treatment solution.

As shown in FIG. 6, the water is injected into the inlet of the $1^{st}$-stage acid recovery chamber of the first adjustment device, which flows through the $2^{nd}$-stage acid recovery chamber, $3^{rd}$ stage acid recovery chamber, . . . , $99^{th}$-stage acid recovery chamber, $100^{th}$-stage acid recovery chamber, and then flows out of the outlet of the $100^{th}$-stage acid recovery chamber to obtain the low-acid solution; wherein the low-acid solution returns to the $1^{st}$-stage acid recovery chamber of the first adjustment device.

Wherein the pH of the post-treatment solution is 1.8.

Step 3 Purification and Enrichment

Step 3.1 According to the molar ratio of oxidant to vanadium ions in the post-treatment solution as 0.35:1, oxidant is added into the post-treatment solution, and stirring for 0.75 hours to obtain the feed solution.

Step 3.2 The organic phase is produced according to the volume ratio of hydroxime extractant to sulfonated kerosene as 1:8; then, according to the volume ratio of the feed solution to the organic phase as 2:1, the loaded organic phase and raffinate are obtained by countercurrent extraction in 2 stages at an extraction temperature of 35° C. and a single stage extraction time of 8 minutes; after neutralization, the raffinate returns to the slurry process in step 1.2 and/or to the water using in the acid recovery chamber in step 2.

Step 3.3 According to the molar ratio of reductant and vanadium in the loaded organic phase as 1:1, the reductant is dissolved into the recovered acid solution as described in step 2 to obtain the stripping regenerant.

Wherein the reductant is ammonium oxalate.

Step 3.4 According to the volume ratio of the loaded organic phase to the stripping regenerant as 6:1, the regenerated organic phase and vanadium-rich solution are obtained by countercurrent extraction in 6 stages at an extraction temperature of 60° C. and a single stage extraction time of 35 minutes; Wherein the regenerated organic phase returns directly to step 3.2 as organic phase for recycling.

Step 4 Preparation of High Purity Vanadium Pentoxide

Step 4.1 According to the molar ratio of vanadium ion in vanadium-rich solution to accelerator as 1:0.025, the accelerator is added into the vanadium-rich solution, and stirring for 0.8 hours to obtain the primary solution for vanadium precipitation; then, the pH of the primary solution is adjusted to 1 to obtain the reaction solution for vanadium precipitation.

Step 4.2 The reaction solution is transferred to a reaction vessel for vanadium precipitation valence conversion at a reaction temperature of 200° C. and a reaction time of 7 hours, then cooled to room temperature; The solid-liquid separation is carried out to obtain vanadium-containing hydroxide and mother liquor after vanadium precipitation.

Wherein the mother liquor after vanadium precipitation is incorporated into the vanadium-containing acid leachate of step 1.2.

Step 4.3 The vanadium-containing hydroxide is roasted with chemical valence conversion under an oxygen-rich atmosphere at a roasting temperature of 350° C. and a roasting time of 1 hours to produce the high purity vanadium pentoxide.

The "Gradient continuous leaching system of vanadium-bearing shale" mentioned in Step 1.2 is the same as the mode of carrying out except for the following technical parameters.

The "Gradient continuous leaching system of vanadium-bearing shale" described in this example is shown in FIG. 3, where n is 2, that is, the system consist of 2 leaching devices 1, 1 steam conveying pipes 5, 2 steam conveying branch pipes 4 and 3 feeding pipes 2.

Wherein the height difference between adjacent leaching devices 1 is $\Delta h_1=5/8$ h.

The distance between each steam conveying branch pipe 4 and the inner wall of the corresponding leaching device 1 is $l_b=1/9$ D.

Wherein the height of the tank 8 is $h=7/5$ D;

the distance of the inlet from the bottom is $l_j=1/6$ h; the distance of the outlet port from the bottom is $l_c=3/4$ h;

the bottom diameter of the spherical tab 16 is $d_q=1/2$ D, the height of spherical tab 16 is $h_q=1/5$ D.

Wherein the diameters of upper slant lobe paddle 7 and the six straight-lobe turbine paddle 6 are $d_j=1/2$ D, the distance between the six straight-lobe turbine paddle 6 and the top of the spherical tab 16 is $l_t=1/10$ h, and the distance between the upper slant lobe paddle 7 and the six straight-lobe turbine paddle 6 is $l_i=1/4$ h.

Wherein the distance between the acid filling pipe 13 and the right inner wall of the tank 8 is $b_2=1/9$ D.

In this example:

the "pH adjusting device of the vanadium-containing acid leachate" mentioned above is the same as the mode of carrying out except that m is 100;

wherein the coordination agent is oxalic acid;

wherein the activator is calcium fluoride;

wherein the oxidant is potassium chlorate;

wherein the hydroxime extractant is a mixture of aldoxime and ketoxime with a volume ratio of 1:1;

wherein the accelerator is lactose;

wherein the volume fraction of oxygen in the oxygen-rich atmosphere is 50%;

wherein the constant voltage mode has an initial current density of 200 A/$m^2$; the constant current mode has an initial current density of 150 A/$m^2$;

the purity of high purity vanadium pentoxide prepared in this example is 99.15%.

Example 3

A method for preparing high purity vanadium pentoxide from vanadium-bearing shale by all-wet process, its steps of this example are the same as Example 1 except for the following technical parameters.

Step 1 Wet Activation and Compound Leaching of Vanadium-Bearing Shale

Step 1.1 Grading Activation of Vanadium-Bearing Shale

Vanadium-bearing shale is broken to particle size less than 3 mm with 82% to obtain vanadium-bearing shale powder.

Mixing the activator with the material under the screen and the material on the screen respectively according to the mass ratio of 0.06:1 to obtain the corresponding mixed material I and mixed material II; Then, adding water to the mixed material I and mixed material II according to the liquid-solid ratio of 0.55 L/kg and performing a slurry process to obtain the corresponding mixed slurry I and mixed slurry II; feeding the mixed slurry I into the mill for wet activation for 2 minutes to obtain the activated slurry I; feeding the mixed slurry II into the mill for wet activation for 24 minutes to obtain the activated slurry II; finally, the activated slurry I and activated slurry II are mixed to obtain the mixed activated slurry.

Step 1.2 Compound Leaching of Vanadium-Bearing Shale

The "Gradient continuous leaching system of vanadium-bearing shale" adopted in this embodiment is shown in FIG. 2, which is formed by 10 leaching devices 1 in series.

The specific process is that the flow quantity of the mixed activated slurry added at a uniform rate is adjusted according to the flow time of the mixed activated slurry with 4 hours in the "Gradient continuous leaching system of vanadium-bearing shale"; then opening all steam conveying branch pipes 4 in the "Gradient continuous leaching system of vanadium-bearing shale", and adjusting the temperature of the tank 8 of the leaching device 1 to 120° C.; Then, adding inorganic acid according to the mass ratio of vanadium-bearing shale to inorganic acid of 1:0.40, and adding 0.85 mol of coordination agent per kg vanadium-bearing shale, the inorganic acid is added at a uniform rate from the acid filling pipe 13 of the first leaching device 1, and the coordination agent is added at a uniform rate from the acid filling pipe 13 of the second leaching device 1.

The mixed slurry output from the lower port of the last feeding pipe 2 of the "Gradient continuous leaching system of vanadium-bearing shale" is subjected to the solid-liquid separation to obtain vanadium-containing acid leachate and leach residue.

Wherein the inorganic acid is a mixture of sulfuric acid and phosphoric acid with a mass ratio of 1:0.6.

Step 2 Adjustment of the pH of the Vanadium-Containing Acid Leachate

The adjustment of the pH of the vanadium-containing acid leachate is divided into two stages, both of which adopt the "pH adjusting device of the vanadium-containing acid leachate" as shown in FIG. 5. In this device, m=500, that is, the device consists of a $500^{th}$-stage conditioning chamber and a $500^{th}$-stage acid recovery chamber. The "pH adjusting device of the vanadium-containing acid leachate" used in the first stage is called the first adjustment device; the "pH adjusting device of the vanadium-containing acid leachate" used in the second stage is called the second adjustment device.

As shown in FIG. 6, connecting the $500^{th}$-stage conditioning chamber of the first adjustment device to the $1^{st}$-stage conditioning chamber of the second adjustment device, and the $500^{th}$-stage acid recovery chamber of the second adjustment device is connected to the $1^{st}$-stage acid recovery chamber of the first adjustment device.

As shown in FIG. 6, wherein the first stage of the adjustment of the pH of the vanadium-containing acid leachate is that the sodium sulfate solution is injected into the anode chamber and the cathode chamber of the first adjustment device, respectively; the vanadium-containing acid leachate is injected into the inlet of the $1^{st}$-stage conditioning chamber of the first adjustment device, and water or low acid solution is injected into the inlet of the $1^{st}$-stage acid recovery chamber of the first adjustment device.

Turning on the DC power supply of the first adjustment device, wherein the DC power supply is set to constant voltage mode.

As shown in FIG. 6, the vanadium-containing acid leachate is injected into the inlet of the $1^{st}$-stage conditioning chamber of the first adjustment device, which flows through the $2^{nd}$-stage conditioning chamber, $3^{rd}$-stage conditioning chamber, . . . , $499^{th}$-stage conditioning chamber, $500^{th}$-stage conditioning chamber, and then flows out of the outlet of the $500^{th}$-stage conditioning chamber to obtain the pre-conditioning solution.

As shown in FIG. 6, the water is injected into the inlet of the $1^{st}$-stage acid recovery chamber of the first adjustment device, which flows through the $2^{nd}$-stage acid recovery chamber, $3^{rd}$ stage acid recovery chamber, . . . , $499^{th}$-stage acid recovery chamber, $500^{th}$-stage acid recovery chamber, and then flows out of the outlet of the $500^{th}$-stage acid recovery chamber to obtain the recovered acid solution; wherein the recovered acid solution is used in the preparation of the inorganic acid as described in step 1.2 and the stripping regenerant as described in step 3.3.

Wherein the pH of the pre-conditioning solution is 1.2.

As shown in FIG. 6, wherein the second stage of the adjustment of the pH of the vanadium-containing acid leachate is that the sodium sulfate solution is injected into the anode chamber and the cathode chamber of the second adjustment device, respectively; the pre-conditioning solution of the first adjustment device is injected into the inlet of the $1^{st}$-stage conditioning chamber of the second adjustment device, and water is injected into the inlet of the $1^{st}$-stage acid recovery chamber of the second adjustment device.

Turning on the DC power supply of the second adjustment device, wherein the DC power supply is set to constant current mode.

As shown in FIG. 6, the pre-conditioning solution is injected into the inlet of the $1^{st}$-stage conditioning chamber of the second adjustment device, which flows through the $2^{nd}$-stage conditioning chamber, $3^{rd}$-stage conditioning chamber, . . . , $499^{th}$-stage conditioning chamber, $500^{th}$-stage conditioning chamber, and then flows out of the outlet of the $500^{th}$-stage conditioning chamber to obtain the post-treatment solution.

As shown in FIG. 6, the water is injected into the inlet of the $1^{st}$-stage acid recovery chamber of the first adjustment device, which flows through the $2^{nd}$-stage acid recovery chamber, $3^{rd}$ stage acid recovery chamber, . . . , $499^{th}$-stage acid recovery chamber, $500^{th}$-stage acid recovery chamber, and then flows out of the outlet of the $500^{th}$-stage acid recovery chamber to obtain the low-acid solution; wherein the low-acid solution returns to the $1^{st}$-stage acid recovery chamber of the first adjustment device.

Wherein the pH of the post-treatment solution is 2.0.

Step 3 Purification and Enrichment

Step 3.1 According to the molar ratio of oxidant to vanadium ions in the post-treatment solution as 0.4:1, oxidant is added into the post-treatment solution, and stirring for 0.65 hours to obtain the feed solution.

Step 3.2 The organic phase is produced according to the volume ratio of hydroxime extractant to sulfonated kerosene as 1:5; then, according to the volume ratio of the feed solution to the organic phase as 4:1, the loaded organic phase and raffinate are obtained by countercurrent extraction in 4 stages at an extraction temperature of 60° C. and a single stage extraction time of 12 minutes; after neutralization, the raffinate returns to the slurry process in step 1.2 and/or to the water using in the acid recovery chamber in step 2.

Step 3.3 According to the molar ratio of reductant and vanadium in the loaded organic phase as 4:1, the reductant is dissolved into the recovered acid solution as described in step 2 to obtain the stripping regenerant.

Wherein the reductant is potassium oxalate.

Step 3.4 According to the volume ratio of the loaded organic phase to the stripping regenerant as 4:1, the regenerated organic phase and vanadium-rich solution are obtained by countercurrent extraction in 5 stages at an extraction temperature of 65° C. and a single stage extraction time of 15 minutes; wherein the regenerated organic phase returns directly to step 3.2 as organic phase for recycling.

Step 4 Preparation of High Purity Vanadium Pentoxide

Step 4.1 According to the molar ratio of vanadium ion in vanadium-rich solution to accelerator as 1:0.035, the accelerator is added into the vanadium-rich solution, and stirring for 1.2 hours to obtain the primary solution for vanadium precipitation; then, the pH of the primary solution is adjusted to 1.5 to obtain the reaction solution for vanadium precipitation.

Step 4.2 The reaction solution is transferred to a reaction vessel for vanadium precipitation valence conversion at a reaction temperature of 180° C. and a reaction time of 5 hours, then cooled to room temperature; the solid-liquid separation is carried out to obtain vanadium-containing hydroxide and mother liquor after vanadium precipitation.

Wherein the mother liquor after vanadium precipitation is incorporated into the vanadium-containing acid leachate of step 1.2.

Step 4.3 The vanadium-containing hydroxide is roasted with chemical valence conversion under an oxygen-rich atmosphere at a roasting temperature of 450° C. and a roasting time of 1.5 hours to produce the high purity vanadium pentoxide.

The "Gradient continuous leaching system of vanadium-bearing shale" mentioned in Step 1.2 is the same as the mode of carrying out except for the following technical parameters.

The "Gradient continuous leaching system of vanadium-bearing shale" described in this example is shown in FIG. 1, where n is 10, that is, the system consist of 10 leaching devices 1, 1 steam conveying pipes 5, 10 steam conveying branch pipes 4 and 11 feeding pipes 2.

Wherein the height difference between adjacent leaching devices 1 is $\Delta h_1 = \frac{1}{2}$ h.

The distance between each steam conveying branch pipe 4 and the inner wall of the corresponding leaching device 1 is $l_b$=⅛ D.

Wherein the height of the tank 8 is h=3/2 D;

the distance of the inlet from the bottom is $l_j$=¼ h;

the distance of the outlet port from the bottom is $l_c$=⅘ h;

the bottom diameter of the spherical tab 16 is $d_q$=⅔ D, the height of spherical tab 16 is $h_q$=⅖ D.

Wherein the diameters of upper slant lobe paddle 7 and the six straight-lobe turbine paddle 6 are $d_j$=⅔ D, the distance between the six straight-lobe turbine paddle 6 and the top of the spherical tab 16 is $l_r$=⅛ h, and the distance between the upper slant lobe paddle 7 and the six straight-lobe turbine paddle 6 is $l_i$=⅓ h.

Wherein the distance between the acid filling pipe 13 and the right inner wall of the tank 8 is $b_2$=⅛ D.

In this example:

the "pH adjusting device of the vanadium-containing acid leachate" mentioned above is the same as the mode of carrying out except that m is 500;

wherein the coordination agent is acetic acid;

wherein the activator is sodium fluoride;

wherein the oxidant is sodium chlorate;

wherein the hydroxime extractant is aldoxime;

wherein the accelerator is fructose;

wherein the volume fraction of oxygen in the oxygen-rich atmosphere is 70%;

wherein the constant voltage mode has an initial current density of 280 A/$m^2$; the constant current mode has an initial current density of 200 A/$m^2$;

the purity of high purity vanadium pentoxide prepared in this example is 99.08%.

Example 4

A method for preparing high purity vanadium pentoxide from vanadium-bearing shale by all-wet process, its steps of this example are the same as Example 1 except for the following technical parameters.

Step 1 Wet Activation and Compound Leaching of Vanadium-Bearing Shale

Step 1.1 Grading Activation of Vanadium-Bearing Shale

Vanadium-bearing shale is broken to particle size less than 3 mm with 75% to obtain vanadium-bearing shale powder.

Mixing the activator with the material under the screen and the material on the screen respectively according to the mass ratio of 0.07:1 to obtain the corresponding mixed material I and mixed material II; Then, adding water to the mixed material I and mixed material II according to the liquid-solid ratio of 0.6 L/kg and performing a slurry process to obtain the corresponding mixed slurry I and mixed slurry II; Feeding the mixed slurry I into the mill for wet activation for 3 minutes to obtain the activated slurry I; Feeding the mixed slurry II into the mill for wet activation for 30 minutes to obtain the activated slurry II; Finally, the activated slurry I and activated slurry II are mixed to obtain the mixed activated slurry.

Step 1.2 Compound Leaching of Vanadium-Bearing Shale

The "Gradient continuous leaching system of vanadium-bearing shale" adopted in this embodiment is shown in FIG. 1, which is formed by 6 leaching devices 1 in series.

The specific process is that the flow quantity of the mixed activated slurry added at a uniform rate is adjusted according to the flow time of the mixed activated slurry with 8 hours in the "Gradient continuous leaching system of vanadium-bearing shale"; then opening all steam conveying branch pipes 4 in the "Gradient continuous leaching system of vanadium-bearing shale", and adjusting the temperature of the tank 8 of the leaching device 1 to 130° C.; Then, adding inorganic acid according to the mass ratio of vanadium-bearing shale to inorganic acid of 1:0.275, and adding 1 mol of coordination agent per kg vanadium-bearing shale, the inorganic acid is added at a uniform rate from the acid filling pipe 13 of the first leaching device 1, and the coordination agent is added at a uniform rate from the acid filling pipe 13 of the second leaching device 1.

The mixed slurry output from the lower port of the last feeding pipe 2 of the "Gradient continuous leaching system of vanadium-bearing shale" is subjected to the solid-liquid separation to obtain vanadium-containing acid leachate and leach residue.

Wherein the inorganic acid is a mixture of sulfuric acid and hydrochloric acid with a mass ratio of 1:1.

Step 2 Adjustment of the pH of the Vanadium-Containing Acid Leachate

The adjustment of the pH of the vanadium-containing acid leachate is divided into two stages, both of which adopt the "pH adjusting device of the vanadium-containing acid leachate" as shown in FIG. 5. In this device, m=1000, that is, the device consists of a $1000^{th}$-stage conditioning chamber and a $1000^{th}$-stage acid recovery chamber. The "pH adjusting device of the vanadium-containing acid leachate" used in the first stage is called the first adjustment device; the "pH adjusting device of the vanadium-containing acid leachate" used in the second stage is called the second adjustment device.

As shown in FIG. 6, connecting the $1000^{th}$-stage conditioning chamber of the first adjustment device to the $1^{st}$-stage conditioning chamber of the second adjustment device, and the $1000^{th}$-stage acid recovery chamber of the second adjustment device is connected to the $1^{st}$-stage acid recovery chamber of the first adjustment device.

As shown in FIG. 6, wherein the first stage of the adjustment of the pH of the vanadium-containing acid leachate is that the sodium sulfate solution is injected into the anode chamber and the cathode chamber of the first adjustment device, respectively; the vanadium-containing acid leachate is injected into the inlet of the $1^{st}$-stage conditioning chamber of the first adjustment device, and water or low acid solution is injected into the inlet of the $1^{st}$-stage acid recovery chamber of the first adjustment device.

Turning on the DC power supply of the first adjustment device, wherein the DC power supply is set to constant voltage mode.

As shown in FIG. 6, the vanadium-containing acid leachate is injected into the inlet of the $1^{st}$-stage conditioning chamber of the first adjustment device, which flows through the $2^{nd}$-stage conditioning chamber, $3^{rd}$-stage conditioning chamber, . . . , $999^{th}$-stage conditioning chamber, $1000^{th}$-stage conditioning chamber, and then flows out of the outlet of the $1000^{th}$-stage conditioning chamber to obtain the pre-conditioning solution.

As shown in FIG. 6, the water is injected into the inlet of the $1^{st}$-stage acid recovery chamber of the first adjustment device, which flows through the $2^{nd}$-stage acid recovery chamber, $3^{rd}$-stage acid recovery chamber, . . . , $999^{th}$-stage acid recovery chamber, $1000^{th}$-stage acid recovery chamber, and then flows out of the outlet of the $1000^{th}$-stage acid recovery chamber to obtain the recovered acid solution; wherein the recovered acid solution is used in the preparation of the inorganic acid as described in step 1.2 and the stripping regenerant as described in step 3.3.

Wherein the pH of the pre-conditioning solution is 1.0.

As shown in FIG. 6, wherein the second stage of the adjustment of the pH of the vanadium-containing acid leachate is that the sodium sulfate solution is injected into the anode chamber and the cathode chamber of the second adjustment device, respectively; the pre-conditioning solution of the first adjustment device is injected into the inlet of the $1^{st}$-stage conditioning chamber of the second adjustment device, and water is injected into the inlet of the $1^{st}$-stage acid recovery chamber of the second adjustment device.

Turning on the DC power supply of the second adjustment device, wherein the DC power supply is set to constant current mode.

As shown in FIG. 6, the pre-conditioning solution is injected into the inlet of the $1^{st}$-stage conditioning chamber of the second adjustment device, which flows through the $2^{nd}$-stage conditioning chamber, $3^{rd}$-stage conditioning chamber, . . . , $999^{th}$-stage conditioning chamber, $1000^{th}$-stage conditioning chamber, and then flows out of the outlet of the $1000^{th}$-stage conditioning chamber to obtain the post-treatment solution.

As shown in FIG. 6, the water is injected into the inlet of the $1^{st}$-stage acid recovery chamber of the first adjustment device, which flows through the $2^{nd}$-stage acid recovery chamber, $3^{rd}$ stage acid recovery chamber, . . . , $999^{th}$-stage acid recovery chamber, $1000^{th}$-stage acid recovery chamber, and then flows out of the outlet of the $1000^{th}$-stage acid recovery chamber to obtain the low-acid solution; Wherein the low-acid solution returns to the $1^{st}$-stage acid recovery chamber of the first adjustment device.

Wherein the pH of the post-treatment solution is 2.5.

Step 3 Purification and Enrichment

Step 3.1 According to the molar ratio of oxidant to vanadium ions in the post-treatment solution as 0.5:1, oxidant is added into the post-treatment solution, and stirring for 0.5 hours to obtain the feed solution.

Step 3.2 The organic phase is produced according to the volume ratio of hydroxime extractant to sulfonated kerosene as 1:2; Then, according to the volume ratio of the feed solution to the organic phase as 6:1, the loaded organic phase and raffinate are obtained by countercurrent extraction in 5 stages at an extraction temperature of 50° C. and a single stage extraction time of 20 minutes; after neutralization, the raffinate returns to the slurry process in step 1.2 and/or to the water using in the acid recovery chamber in step 2.

Step 3.3 According to the molar ratio of reductant and vanadium in the loaded organic phase as 5:1, the reductant is dissolved into the recovered acid solution as described in step 2 to obtain the stripping regenerant.

Wherein the reductant is oxalic acid.

Step 3.4 According to the volume ratio of the loaded organic phase to the stripping regenerant as 3:1, the regenerated organic phase and vanadium-rich solution are obtained by countercurrent extraction in 2 stages at an extraction temperature of 80° C. and a single stage extraction time of 30 minutes; Wherein the regenerated organic phase returns directly to step 3.2 as organic phase for recycling.

Step 4 Preparation of High Purity Vanadium Pentoxide

Step 4.1 According to the molar ratio of vanadium ion in vanadium-rich solution to accelerator as 1:0.05, the accelerator is added into the vanadium-rich solution, and stirring for 1.5 hours to obtain the primary solution for vanadium precipitation; then, the pH of the primary solution is adjusted to 2 to obtain the reaction solution for vanadium precipitation.

Step 4.2 The reaction solution is transferred to a reaction vessel for vanadium precipitation valence conversion at a reaction temperature of 160° C. and a reaction time of 4 hours, then cooled to room temperature; The solid-liquid separation is carried out to obtain vanadium-containing hydroxide and mother liquor after vanadium precipitation.

Wherein the mother liquor after vanadium precipitation is incorporated into the vanadium-containing acid leachate of step 1.2.

Step 4.3 The vanadium-containing hydroxide is roasted with chemical valence conversion under an oxygen-rich atmosphere at a roasting temperature of 500° C. and a roasting time of 2 hours to produce the high purity vanadium pentoxide.

The "Gradient continuous leaching system of vanadium-bearing shale" mentioned in Step 1.2 is the same as the mode of carrying out except for the following technical parameters:

The "Gradient continuous leaching system of vanadium-bearing shale" described in this example is shown in FIG. 1, where n is 6, that is, the system consist of 6 leaching devices 1, 1 steam conveying pipes 5, 6 steam conveying branch pipes 4 and 7 feeding pipes 2.

Wherein the height difference between adjacent leaching devices 1 is $\Delta h_1 = 3/4\ h$.

The distance between each steam conveying branch pipe 4 and the inner wall of the corresponding leaching device 1 is $l_b = 1/9\ D$.

Wherein the height of the tank 8 is h=4/3 D;

the distance of the inlet from the bottom is $l^jA = 1/4\ h$;

the distance of the outlet port from the bottom is $l_c = 4/5\ h$;

the bottom diameter of the spherical tab 16 is $d_q = 1/2\ D$, the height of spherical tab 16 is $h_q = 1/5\ D$.

Wherein the diameters of upper slant lobe paddle 7 and the six straight-lobe turbine paddle 6 are $d_j = 2/3\ D$, the distance between the six straight-lobe turbine paddle 6 and the top of the spherical tab 16 is $l_t = 1/10\ h$, and the distance between the upper slant lobe paddle 7 and the six straight-lobe turbine paddle 6 is $l_i = 1/3\ h$.

Wherein the distance between the acid filling pipe 13 and the right inner wall of the tank 8 is $b_2 = 1/8\ D$.

In this Example:

the "pH adjusting device of the vanadium-containing acid leachate" mentioned above is the same as the mode of carrying out except that m is 1000;

wherein the coordination agent is a mixture of oxalic acid and tartaric acid with a mass ratio of 1:1;

wherein the activator is ammonium fluoride;

wherein the oxidant is potassium chlorate;

wherein the hydroxime extractant is ketoxime;

wherein the accelerator is a mixture of fructose and lactose with a mass ratio of 1:1;

wherein the volume fraction of oxygen in the oxygen-rich atmosphere is 100%;

wherein the constant voltage mode has an initial current density of 300 $A/m^2$; the constant current mode has an initial current density of 300 $A/m^2$;

the purity of high purity vanadium pentoxide prepared in this example is 99.02%.

This mode of carrying out has the following positive effects compared to the existing technologies.

1. This mode of carrying out adopts a "Gradient continuous leaching system of vanadium-bearing shale" in the compound leaching of vanadium-bearing shale. The tank 8 of the system is equipped with a double-layer stirring paddle with an upper slant-lobe and lower straight-lobe and a bottom convex platform with arc-shaped, which forms an efficient dispersion area at the bottom to enhance the axial flow of the liquid phase. It also causes the flow field inside tank 8 to flip up and down to form a circulating flow, which improves the distribution characteristics of the flow field inside the tank 8 and effectively reduces mineral deposition at the bottom. The steam conveying branch pipe is located near the lower six straight-lobe turbine paddle, and due to the tortuosity of the flow field near the lower paddle, the speed fluctuation is large, which can improve the gas dispersion effect and ensure uniform heating of the tank. The "Gradient continuous leaching system of vanadium-bearing shale" efficiently couples mineral distribution and temperature dispersion, which reduces energy consumption by 15~25%.

2. This mode of carrying out adopts a method of wet chemical activation—compound acid leaching to leach vanadium-bearing shale. Grading activation improves the activation effect of coarse particles, avoids over-activation of fine particles, reduces the agglomeration phenomenon during the leaching process, improves activation efficiency, and reduces reagent consumption. Through activation, it promotes the bonding and adsorption of fluorine ions with vanadium-containing phase, enhances surface negativity and wettability, reduces the energy barrier of the dissolution reaction of vanadium-containing phase in vanadium-bearing shale, and enhances the dissolution of vanadium. Through the process of first activating and then acid leaching, fluorine ions are pre-combined with silicon aluminum on the mica structure under mechanical force to form chemical adsorption. Hydrofluoric acid is not generated in the subsequent acid leaching process, which avoids environmental issues such as hydrofluoric acid smoke and is environmentally friendly. Through the combination of inorganic acids and coordination agents, the leaching process synergistically and efficiently destroys vanadium-containing phases, promotes the dissolution of vanadium-containing silicate minerals, further reduces acid consumption, and ultimately achieves a vanadium leaching rate of over 90%. This all-wet vanadium extraction technology eliminates the roasting process, shortens the process flow, and achieves source reduction of $CO_2$.

3. The "pH adjusting device of the vanadium-containing acid leachate" adopted by this mode of carrying out to adjust the pH of vanadium-containing acid leachate through selective electrodialysis with multi-stage dual mode series, which avoids the problems of high reagent consumption and large slag production in the existing alkali neutralization technology and reducing the concentration of vanadium ions by reverse osmosis of diffusion dialysis water. It is not easy to reach the limit current density using the constant voltage mode in the early stage, while the constant current mode in the later stage can maintain a stable ion mass transfer rate, which can accelerate the separation of hydrogen and vanadium ions in the vanadium-containing acid leachate, without the need for any reagents, solid-liquid separation, and can't generate any neutralization slag or ammonia nitrogen wastewater. The retention rate of vanadium is above 95%, and the recovery rate of acid is above 85%. The concentration of recovered acid is 1.5~2.5 mol/L, which can be directly used for the preparation of inorganic acids in the leaching process and stripping regenerant, without causing vanadium loss.

4. This mode of carrying out uses a process of hydroxime extraction and reductive stripping regeneration to separate and enrich vanadium. The double functional groups of oxime group and phenolic hydroxyl group connect with vanadium to form an electroneutral chelate with a stable double-ring structure, which has good selectivity. The extraction process is less affected by pH and has strong adaptability, with a single stage extraction rate of 85~95% for vanadium, and vanadium and impurities are efficiently separated and enriched. The co-extraction rate of iron, aluminum, magnesium, potassium, and phosphorus ions is all less than 3%. By utilizing the synergistic effect of the reducibility of oxalate and the hydrogen ions provided by dilute acid, and the lower coordination ability of tetravalent vanadium with the organic phase than pentavalent vanadium, the pentavalent vanadium in the organic phase is reduced and released into the stripping solution, and the hydrogen ions in the stripping agent replace the vanadium in the extracting agent, which achieves the synchronous regeneration for functional groups of the extracting agent and replaces the regeneration process of the organic phase. This process is simple.

5. This mode of carrying out adopts a method of vanadium precipitation with valence conversion—oxidation roasting to prepare high purity vanadium pentoxide. The excess oxalic or oxalate in the vanadium-rich solution is used to reduce $VO_2^+$ to $VO^+$ while providing $OH^-$ to promote the formation of VO(OH). Using sugars as accelerator in vanadium precipitation, their rich oxygen-containing groups can provide a large number of nucleation sites, which promote the rapid nucleation of vanadium oxide ions and improve the yield of vanadium precipitation. In addition, oxalate can form a coordination structure with impurity cations to avoid their coprecipitation. This product has high crystallinity, fewer internal impurity ions, and a vanadium precipitation rate higher than 99%. After oxidation roasting, the prepared vanadium pentoxide product is shown in the attached figure. FIG. 1 shows the X-ray diffraction pattern of the high purity vanadium pentoxide prepared in Example 2, and from FIG. 1, it can be seen that the prepared vanadium pentoxide has no impurity peaks and high purity. FIG. 2 shows the X-ray diffraction pattern of the vanadium containing hydroxide prepared in Example 2, and it also can be seen from FIG. 2 that the prepared vanadium containing hydroxide has no impurity peaks. Therefore, the purity of vanadium pentoxide prepared using this vanadium-containing hydroxide is high, with a purity greater than 99%. The entire process doesn't introduce ammonia nitrogen, nor does it generate ammonia nitrogen wastewater and waste gas, making it environmentally friendly.

6. This mode of carrying out achieves 100% recycling and utilization of wastewater generated during the preparation of high purity vanadium pentoxide, such as extraction residue, recovering acid solution, and mother liquor after vanadium precipitation, which achieves zero discharging of wastewater during the preparation process. The present invention is green environmental protection.

Therefore, this mode of carrying out has the characteristics of short process flow, environmental friendliness, low dosage of reagents, low energy consumption, high vanadium recovery rate, and high product purity.

What is claimed is:

1. A method for preparing high purity vanadium pentoxide from vanadium-bearing shale by all-wet process, the method comprises the steps of:

step 1, wet activation and compound leaching of the vanadium-bearing shale, including:

step 1.1, grading activation of the vanadium-bearing shale, including:

the vanadium-bearing shale is broken to a particle size less than 3 mm with 75~95% to obtain a vanadium-bearing shale powder; then the vanadium-bearing shale powder is screened with a 0.45 mm standard screen to obtain a material under the screen and a material on the screen;

mixing an activator with the material under the screen and the material on the screen respectively according to a mass ratio of (0.04~0.07):1 to obtain a mixed material I and a mixed material II; then, adding water to the mixed material I and the mixed material II according to a liquid-solid ratio of 0.4~0.6 L/kg and performing a slurry process to obtain a mixed slurry I and a mixed slurry II respectively; feeding the mixed slurry I into a mill for wet activation for 1~4 minutes to obtain an activated slurry I;

feeding the mixed slurry II into the mill for wet activation for 10~30 minutes to obtain an activated slurry II; finally, the activated slurry I and the activated slurry II are mixed to obtain a mixed activated slurry;

step 1.2, compound leaching of the vanadium-bearing shale, including:

the mixed activated slurry is added at a uniform rate from an upper port of a first feeding pipe (2) of a gradient continuous leaching system of vanadium-bearing shale, and a flow quantity of the mixed activated slurry added at a uniform rate is adjusted according to a flow time of the mixed activated slurry with 4~8 hours in the gradient continuous leaching system of vanadium-bearing shale; then opening all steam conveying branch pipes (4) in the gradient continuous leaching system of vanadium-bearing shale, and adjusting a temperature of a tank (8) of a leaching device (1) to 98~130° C.; then, adding an inorganic acid according to a mass ratio of the vanadium-bearing shale to the inorganic acid of 1:(0.275~0.40), and adding 0.5~1 mol of a coordination agent per kg the vanadium-bearing shale, the inorganic acid is added at a uniform rate from an acid filling pipe (13) of a first leaching device (1), and the coordination agent is added at a uniform rate from the acid filling pipe (13) of a second leaching device (1);

the mixed slurry output from a lower port of the last feeding pipe (2) of the gradient continuous leaching system of vanadium-bearing shale is subjected to a solid-liquid separation to obtain a vanadium-containing acid leachate and a leach residue;

wherein the inorganic acid is a mixture obtained by a volume ratio of sulfuric acid to other inorganic acids except for the sulfuric acid with 1:(0~1); wherein the other inorganic acids except for the sulfuric acid are more than one of phosphoric acid and hydrochloric acid;

step 2, adjustment of pH of the vanadium-containing acid leachate, including:

the adjustment of the pH of the vanadium-containing acid leachate is divided into two stages, and a pH adjusting device of the vanadium-containing acid leachate includes a first adjustment device used in a first stage and a second adjustment device used in a second stage; and the first adjustment device and the second adjustment device are an identical type of adjustment device;

connecting $m^{th}$-stage conditioning chamber of the first adjustment device to $1^{st}$-stage conditioning chamber of the second adjustment device; $m^{th}$-stage acid recovery chamber of the second adjustment device is connected to $1^{st}$-stage acid recovery chamber of the first adjustment device;

wherein the first stage of the adjustment of the pH of the vanadium-containing acid leachate is that a sodium sulfate solution is injected into an anode chamber and a cathode chamber of the first adjustment device, respectively; the vanadium-containing acid leachate is injected into an inlet of $1^{st}$-stage conditioning chamber of the first adjustment device, and water or low acid solution is injected into an inlet of $1^{st}$-stage acid recovery chamber of the first adjustment device;

turning on a DC power supply of the first adjustment device, wherein the DC power supply is set to constant voltage mode;

the vanadium-containing acid leachate is injected into the inlet of the $1^{st}$-stage conditioning chamber of the first adjustment device, which flows through $2^{nd}$-stage conditioning chamber, $3^{rd}$-stage conditioning chamber, . . . , $m-1^{th}$-stage conditioning chamber, $m^{th}$-stage conditioning chamber, and then flows out of an outlet of the $m^{th}$-stage conditioning chamber to obtain a pre-conditioning solution;

the water is injected into the inlet of the $1^{st}$-stage acid recovery chamber of the first adjustment device, which flows through $2^{nd}$-stage acid recovery chamber, $3^{rd}$-stage acid recovery chamber, . . . , $m-1^{th}$-stage acid recovery chamber, $m^{th}$-stage acid recovery chamber, and then flows out of an outlet of the $m^{th}$-stage acid recovery chamber to obtain a recovered acid solution; wherein the recovered acid solution is used in preparation of the inorganic acid as described in step 1.2 and a stripping regenerant as described in step 3.3;

wherein the pH of the pre-conditioning solution is 0.5~1.2;

wherein the second stage of the adjustment of the pH of the vanadium-containing acid leachate is that the sodium sulfate solution is injected into the anode chamber and the cathode chamber of the second adjustment device, respectively; the pre-conditioning solution of the first adjustment device is injected into the inlet of the $1^{st}$-stage conditioning chamber of the second adjustment device, and water is injected into the inlet of the $1^{st}$-stage acid recovery chamber of the second adjustment device;

turning on the DC power supply of the second adjustment device, wherein the DC power supply is set to constant current mode;

the pre-conditioning solution is injected into the inlet of the $1^{st}$-stage conditioning chamber of the second adjustment device, which flows through the $2^{nd}$-stage conditioning chamber, the $3^{rd}$-stage conditioning chamber, . . . , the $m-1^{th}$-stage conditioning chamber, the $m^{th}$-stage conditioning chamber, and then flows out of the outlet of the $m^{th}$-stage conditioning chamber to obtain a post-treatment solution;

the water is injected into the inlet of the $1^{st}$-stage acid recovery chamber of the first adjustment device, which flows through the $2^{nd}$-stage acid recovery chamber, the $3^{rd}$-stage acid recovery chamber, . . . , the $m-1^{th}$-stage acid recovery chamber, the $m^{th}$-stage acid recovery chamber, and then flows out of the outlet of the $m^{th}$-stage acid recovery chamber to obtain a low-acid solution; wherein the low-acid solution returns to the $1^{st}$-stage acid recovery chamber of the first adjustment device;

wherein the pH of the post-treatment solution is 1.5~2.5;

step 3, purification and enrichment, including:

step 3.1, according to a molar ratio of oxidant to vanadium ions in the post-treatment solution as (0.3~0.5):1, the oxidant is added into the post-treatment solution, and stirring for 0.5~1 hours to obtain a feed solution;

step 3.2, an organic phase is produced according to a volume ratio of hydroxime extractant to sulfonated kerosene as 1:(2~9); then, according to a volume ratio of the feed solution to the organic phase as (2~6):1, a loaded organic phase and a raffinate are obtained by countercurrent extraction in 2~5 stages at an extraction temperature of 25~60° C. and a single stage extraction time of 8~20 minutes; after neutralization, the raffinate returns to the slurry process in step 1.2 and/or to the water using in the $1^{st}$-stage acid recovery chamber of the first adjustment device in step 2;

step 3.3, according to a molar ratio of reductant and vanadium in the loaded organic phase as (1~5):1, the reductant is dissolved into the recovered acid solution as described in step 2 to obtain a stripping regenerant;

wherein the reductant is one or more than one of oxalic acid, potassium oxalate, sodium oxalate, ammonium oxalate;

step 3.4, according to a volume ratio of the loaded organic phase to the stripping regenerant as (3~6):1, a regenerated organic phase and a vanadium-rich solution are obtained by countercurrent extraction in 2~6 stages at an extraction temperature of 60~80° C. and a single stage extraction time of 15~35 minutes; wherein the regenerated organic phase returns directly to step 3.2 as the organic phase for recycling;

step 4 preparation of the high purity vanadium pentoxide, including:

step 4.1, according to a molar ratio of vanadium ion in the vanadium-rich solution to an accelerator as 1:(0.01~0.05), the accelerator is added into the vanadium-rich solution, and stirring for 0.5~1.5 hours to obtain a primary solution for vanadium precipitation; then, the pH of the primary solution is adjusted to 0.5~2 to obtain a reaction solution for vanadium precipitation;

step 4.2, the reaction solution is transferred to a reaction vessel for vanadium precipitation valence conversion at a reaction temperature of 160~220° C. and a reaction time of 4~8 hours, then cooled to room temperature; a solid-liquid separation is carried out to obtain a vanadium-containing hydroxide and a mother liquor after vanadium precipitation;

wherein the mother liquor after vanadium precipitation is incorporated into the vanadium-containing acid leachate of step 1.2;

step 4.3, the vanadium-containing hydroxide is roasted with chemical valence conversion under an oxygen-rich atmosphere at a roasting temperature of 300~500° C. and a roasting time of 0.5~2 hours to produce the high purity vanadium pentoxide;

wherein the gradient continuous leaching system of vanadium-bearing shale described in step 1.2 consist of n the leaching devices (1), steam conveying pipes (5), n the steam conveying branch pipes (4) and n+1 the feeding pipes (2);

with the purpose of convenient narration, relevant letters are uniformly described as follows:

n indicates a number of the leaching devices (1), the steam conveying branch pipes (4) and the feeding pipes (2), n is a natural number from 2 to 10;

h indicates a height of the tank (8) in the leaching device (1), its unit is mm;

D indicates a diameter of the tank (8) in the leaching device (1), its unit is mm;

wherein the leaching devices (1) in the gradient continuous leaching system of vanadium-bearing shale are setting in a ladder pattern with a height difference $\Delta h_1=(3/4\sim1/2)$ h;

the upper port of the first feeding pipe (2) is connected to an external feeding bin, and the lower port of the first feeding pipe (2) is connected to the inlet of the first leaching device (1); the upper port of the second feeding pipe (2) is connected to the outlet of the first leaching device (1), and the lower port of the second feeding pipe (2) is connected to the inlet of the second leaching device (1); and so on, an upper port of the $n^{th}$ feeding pipe (2) is connected to an outlet of the $n-1^{th}$ leaching device (1), and a lower port of the $n^{th}$ feeding pipe (2) is connected to an inlet of the $n^{th}$ leaching device (1); an upper port of the $n+1^{th}$ feeding pipe (2) is connected to an outlet of the $n^{th}$ leaching device (1), and a lower port of the $n+1^{th}$ feeding pipe (2) is connected to next working procedure; each feeding pipe (2) is equipped with a gate valve (3) near the upper port;

each leaching device (1) is equipped with the steam conveying branch pipe (4), an inlet of each steam conveying branch pipe (4) is connected to the steam conveying pipe (5), and an outlet of each steam conveying branch pipe (4) is located above a feed port of feeding pipe (2) in the corresponding leaching device (1); a distance between each steam conveying branch pipe (4) and an inner wall of the corresponding leaching device (1) is $l_b=(1/10\sim1/8)$ D;

wherein all leaching devices (1) consist of the tank (8), a cover plate (9), a drive motor (10), an upper slant lobe paddle (7), a lower straight lobe stirring paddle (6) and an acid filling tank (12); wherein the tank (8) is cylindrical, and a height of the tank (8) is h=(4/3~3/2) D; there is an inlet port on one side of the tank (8), a distance of the inlet port from a bottom is $l_j=(1/10\sim1/4)$ h; there is an outlet port on the other side of the tank (8), a distance of the outlet port from the bottom is $l_c=(3/4\sim4/5)$ h; there is a spherical tab (16) at a bottom center of the tank (8), a bottom diameter of the spherical tab (16) is $d_q=(2/5\sim2/3)$ D, a height of spherical tab (16) is $h_q=(1/10\sim2/5)$ D;

an upper part of the tank (8) is fixed with the cover plate (9), wherein a center of cover plate (9) is equipped with the drive motor (10), wherein the drive motor (10) is connected to an upper part of a mixing shaft (14) via coupling, and a lower part of the mixing shaft (14) passing the cover plate (9) extends into the tank (8); a mid of the mixing shaft (14) is equipped with the upper slant lobe paddle (7), and a bottom of the mixing shaft (14) is connected to the lower straight lobe stirring paddle (6) via a hub (15); diameters of the upper slant lobe paddle (7) and the lower straight lobe stirring paddle (6) are $d_j=(1/3\sim2/3)$ D, a distance between the lower straight lobe stirring paddle (6) and a top of the spherical tab (16) is $l_t=(1/20\sim1/8)$ h, and a distance between the upper slant lobe paddle (7) and the lower straight lobe stirring paddle (6) is $l_i=(1/5\sim1/3)$ h;

there is a lower acid filling pipe (13) on one side of the cover plate (9), a lower part of the lower acid filling pipe (13) passing the cover plate (9) extends into the tank (8), an upper part of the lower acid filling pipe (13) is connected to an outlet of the acid filling tank (12), an inlet of the acid filling tank (12) is connected to the lower part of the upper acid filling pipe (13), the upper part of the upper acid filling pipe (13) is connected to a relevant acid source; the upper acid filling pipe (13) and the lower acid filling pipe (13) are equipped with a butterfly valve (11) respectively;

wherein a distance between the acid filling pipe (13) and right inner wall of the tank (8) is $b_2=(1/10\sim1/8)$ D;

wherein the pH adjusting device of the vanadium-containing acid leachate described in step 2 is that a cathode is connected to a negative terminal of the DC power supply and an anode is connected to a positive terminal of the DC power supply; the cathode and the anode are placed correspondingly on right side and left side of membrane stack;

wherein the membrane stack consists of $1^{st}$ cation exchange membrane, $1^{st}$ anion exchange membrane, $2^{nd}$ cation exchange membrane, $2^{nd}$ anion exchange membrane, $3^{rd}$ cation exchange membrane, . . . , $m^{th}$ cation exchange membrane, $m^{th}$ anion exchange membrane and $m+1^{th}$ cation exchange membrane in order from a direction of the anode to the cathode;

wherein m is a positive integer from 10 to 1000;

from the direction of the anode to the cathode, a gap between the anode and the $1^{st}$ cation exchange membrane forms the anode chamber, a gap between the $1^{st}$ cation exchange membrane and the $1^{st}$ anion exchange membrane forms the $1^{st}$-stage conditioning chamber, a gap between the $1^{st}$ anion exchange membrane and the $2^{nd}$ cation exchange membrane forms the $m^{th}$-stage acid recovery chamber, a gap between the $2^{nd}$ cation exchange membrane and the $2^{nd}$ anion exchange membrane forms the $2^{nd}$-stage conditioning chamber, a gap between the $2^{nd}$ anion exchange membrane and the $3^{rd}$ cation exchange membrane forms the $m-1^{th}$ stage acid recovery chamber, . . . , and so on;

a gap between the $m-1^{th}$ stage cation exchange membrane and the $m-1^{th}$ stage anion exchange membrane forms the $m-1^{th}$ stage conditioning chamber, a gap between the $m-1^{th}$ stage anion exchange membrane and the $m^{th}$ stage cation exchange membrane forms the $2^{nd}$ stage acid recovery chamber, a gap between the $m^{th}$ stage cation exchange membrane and the $m^{th}$ stage anion exchange membrane forms the $m^{th}$-stage conditioning chamber, a gap between the $m^{th}$ stage anion exchange membrane and the $m+1^{th}$ stage cation exchange membrane forms the $1^{st}$-stage acid recovery chamber, a gap between the $m+1^{th}$ stage cation exchange membrane and the cathode forms the cathode chamber;

wherein the $1^{st}$-stage conditioning chamber, the $2^{nd}$-stage conditioning chamber, the $3^{rd}$ stage conditioning chamber, . . . , the $m-1^{th}$-stage conditioning chamber, and the $m^{th}$-stage conditioning chamber are connected in sequence;

wherein the $1^{st}$-stage acid recovery chamber, the $2^{nd}$-stage acid recovery chamber, the $3^{rd}$-stage acid recovery chamber, . . . , the $m-1^{th}$-stage acid recovery chamber, the $m^{th}$ stage acid recovery chamber are connected in sequence;

wherein the pH adjusting device of the vanadium-containing acid leachate is obtained by forming a series circuit between the anode electrode chamber, the $1^{st}$-stage conditioning chamber, the $m^{th}$-stage acid recovery chamber, the $2^{nd}$-stage conditioning chamber, the $m-1^{th}$-stage acid recovery chamber, . . . , the $m-1^{th}$-stage conditioning chamber, the $2^{nd}$-stage acid recovery chamber, the $m^{th}$-stage conditioning chamber, the $1^{st}$-stage acid recovery chamber, the cathode electrode chamber and the DC power supply in the operating condition.

2. The method for preparing the high purity vanadium pentoxide from vanadium-bearing shale by all-wet process according to claim 1, wherein the coordination agent is one or more than one of oxalic acid, acetic acid, citric acid, and tartaric acid.

3. The method for preparing the high purity vanadium pentoxide from vanadium-bearing shale by all-wet process according to claim 1, wherein the activator is one or more than one of sodium fluoride, calcium fluoride, potassium fluoride, and ammonium fluoride.

4. The method for preparing the high purity vanadium pentoxide from vanadium-bearing shale by all-wet process according to claim 1, wherein the oxidant is sodium chlorate, or potassium chlorate.

5. The method for preparing the high purity vanadium pentoxide from vanadium-bearing shale by all-wet process according to claim 1, wherein the hydroxime extractant contains more than one of aldoxime and ketoxime.

6. The method for preparing the high purity vanadium pentoxide from vanadium-bearing shale by all-wet process according to claim 1, wherein the accelerator is one or more than one of glucose, fructose and lactose.

7. The method for preparing the high purity vanadium pentoxide from vanadium-bearing shale by all-wet process according to claim 1, wherein the volume fraction of oxygen in the oxygen-rich atmosphere is 30~100%.

8. The method for preparing the high purity vanadium pentoxide from vanadium-bearing shale by all-wet process according to claim 1, wherein a gasket is equipped between the upper part of the tank (8) and the cover plate (9).

9. The method for preparing the high purity vanadium pentoxide from vanadium-bearing shale by all-wet process according to claim 1, wherein a material of the leaching device (1) and the feeding pipe (2) is acid-resistant steel.

10. The method for preparing the high purity vanadium pentoxide from vanadium-bearing shale by all-wet process according to claim 1, wherein the constant voltage mode has an initial current density of 120~300 $A/m^2$; the constant current mode has an initial current density of 120~300 $A/m^2$.

* * * * *